US012205568B2

(12) United States Patent
Yamaguchi

(10) Patent No.: US 12,205,568 B2
(45) Date of Patent: Jan. 21, 2025

(54) KEYBOARD DEVICE FOR KEYBOARD INSTRUMENT

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 171 days.

(21) Appl. No.: 17/949,979

(22) Filed: Sep. 21, 2022

(65) Prior Publication Data

US 2023/0097821 A1 Mar. 30, 2023

(30) Foreign Application Priority Data

Sep. 30, 2021 (JP) ................................ 2021-161027
Sep. 30, 2021 (JP) ................................ 2021-161028

(51) Int. Cl.
*G10H 1/34* (2006.01)

(52) U.S. Cl.
CPC .................................. *G10H 1/346* (2013.01)

(58) Field of Classification Search
CPC ...................................................... G10H 1/346
See application file for complete search history.

(56) References Cited

U.S. PATENT DOCUMENTS 8,809,659 B2 * 8/2014 Osuga .................... G10H 1/344 84/439
8,987,570 B2 * 3/2015 Osuga .................... G10H 1/346 84/433
10,373,596 B2 * 8/2019 Suzuki ................... G10H 1/346
2006/0021490 A1 * 2/2006 Yamaguchi .............. G10C 3/12 84/236
2011/0017049 A1 * 1/2011 Shimoda .................. G10C 3/12 84/744
2013/0081532 A1 * 4/2013 Suzuki ................... G10H 1/346 84/720

(Continued)

FOREIGN PATENT DOCUMENTS

JP 2002207484 A * 7/2002
JP 2015-87591 5/2015

(Continued)

*Primary Examiner* — Robert W Horn
(74) *Attorney, Agent, or Firm* — LEWIS ROCA ROTHGERBER CHRISTIE LLP

(57) ABSTRACT

A keyboard device for a keyboard instrument includes a keyboard chassis, a plurality of keys arranged side by side in an upper portion of the keyboard chassis, and a plurality of hammers provided in association with the plurality of keys, respectively. Each hammer is pivotally supported, below an associated key, via a hammer support shaft on the keyboard chassis, and is pivotally moves in a manner interlocked with depression of the associated key. For a predetermined first hammer, which is associated with a predetermined first key of the plurality of keys, and a predetermined second hammer, which is associated with a predetermined second key of the plurality of keys, respective angles of pivotal movement, caused by key depression, of the first hammer and the second hammer are set to be different from each other.

10 Claims, 17 Drawing Sheets

(56) References Cited

U.S. PATENT DOCUMENTS

| | | | | |
|---|---|---|---|---|
| 2016/0293152 | A1* | 10/2016 | Takata | G10H 1/346 |
| 2023/0097821 | A1* | 3/2023 | Yamaguchi | G10H 1/346<br>84/433 |
| 2023/0317040 | A1* | 10/2023 | Yamaguchi | G10H 1/346<br>84/744 |
| 2024/0112655 | A1* | 4/2024 | Yamaguchi | G10H 1/346 |
| 2024/0112660 | A1* | 4/2024 | Yamaguchi | G10H 1/346 |

FOREIGN PATENT DOCUMENTS

| | | | |
|---|---|---|---|
| JP | 2016-191832 | A | 11/2016 |
| JP | 2020-52391 | A | 4/2020 |

* cited by examiner

L
22
22a
61
62
26
26a
26b
63
64
2(2a)
2(2b)

KEYBOARD DEVICE FOR KEYBOARD INSTRUMENT

CROSS-REFERENCE TO RELATED APPLICATIONS

This application claims priority to Japanese Patent Application Number 2021-161027, filed on Sep. 30, 2021, and Japanese Patent Application Number 2021-161028, filed on Sep. 30, 2021, the entire content of each of which is incorporated herein by reference.

BACKGROUND OF THE INVENTION

Field of the Invention

The present invention relates to a keyboard device which is applied to a keyboard instrument, such as an electronic piano, and includes a hammer pivotally moving in a manner interlocked with depression of an associated key.

Description of the Related Art

Conventionally, as this type of a keyboard device, there has been known, for example, one disclosed in Japanese Laid-Open Patent Publication (Kokai) No. 2020-52391 (FIGS. 3 to 5) already filed by the present applicant. This keyboard device is comprised of a plurality of keys each extending in a front-rear direction and arranged side by side in a left-right direction, and a plurality of linkages supporting respective keys from below and including weights (hammers) for adding a touch weight (weight felt on a fingertip during depression each key) to the keys. Each linkage includes a front-side connecting link bar extending a predetermined length in the front-rear direction with a front end thereof pivotally connected to a front portion of an associated one of the keys, a rear-side connecting link bar with a rear end thereof pivotally connected to a rear end of the associated key, and the above-mentioned weight mounted such that it extends rearward from a rear end of the front-side connecting link bar. The above-described connecting link bars are each pivotally supported via a support pin formed at about a longitudinal center thereof. Further, the rear end of the front-side connecting link bar and a front end of the rear-side connecting link bar are pivotally and slidably connected to each other. Further, the weight is comprised of an arm extending horizontally and rearward a predetermined length from a rear portion of the front-side connecting link bar, and a weight body fixed to a rear end of the arm.

Furthermore, there has been known, for example, one disclosed in Japanese Laid-Open Patent Publication (Kokai) No. 2016-191832. This keyboard device includes a chassis made of a synthetic resin. Hammers are pivotally supported on hammer support shafts (hereinafter simply referred to as "the support shafts) of the chassis. The support shafts are integrally formed with the chassis, protrude laterally, and are circular in cross-section. On the other hand, the hammers are made of a synthetic resin, and each include a hammer body extending in the front-rear direction and a bearing portion integrally formed with the hammer body at an intermediate portion of the hammer body and supported on associated one of the support shafts. The bearing portion is formed such that it has a C shape open rearward, and includes a central circular holding hole and a guide groove continuous with the holding hole and open rearward. Further, in a key-released state, the guide groove extends substantially horizontally, and is formed into a shape tapered toward the holding hole. The smallest width thereof is smaller than a diameter of the support shaft.

In the keyboard device disclosed in Japanese Laid-Open Patent Publication (Kokai) No. 2020-52391 (FIGS. 3 to 5), when a front end of a key is depressed, the connecting link bars of an associated one of the linkages are pivotally moved about support pins in respective predetermined directions, and a horizontal arm of the weight of the linkage is sloped such that the weight becomes higher as it extends rearward. In this case, the own weight of the weight acts on the rear portion of the front-side connecting link bar, whereby the key is firmly supported from below by the linkage, and this increases, during depression of the key, a touch weight as a reaction force against the depression. When the front end of the key is depressed to its lowest position, a rear end of the key is positioned lower by a distance which is approximately half of a travel distance of the front end of the key. With this, the key operates such that it pivotally moves about a virtual pivot located rearward by almost the same length as the length of the key, so that it is possible to obtain the same key operation as that of a keyboard of an acoustic grand piano in spite of the key being configured such that it has a shorter length than that of the key of the acoustic grand piano.

In the above-described conventional keyboard device, the operation of the weight in accordance with depression of an associated key is uniform, and therefore the touch weights of all the keys are made uniform. Normally, in the keyboard of the acoustic grand piano, the touch weight of a key in a lower-pitched range is heavy, whereas the touch weight of a key in a higher-pitched range is light. However, when the above-described keyboard device is applied to an electronic piano, the touch weights of all the keys of the electronic piano are made uniform, and it is impossible to obtain a keyboard device having touch weight similar to that of the keyboard of the acoustic grand piano.

Further, since, Japanese Laid-Open Patent Publication (Kokai) No. 2020-52391 (FIGS. 3 to 5) discloses only a linkage for supporting a white key, it is difficult to apply the linkage to a black key as it is. Of course, although it is possible to manufacture a linkage adapted to a black key, if linkages are manufactured separately from each other depending on whether they are associated with white keys or black keys, manufacturing costs increase. Furthermore, normally, in the keyboard of the acoustic grand piano, the pivot of a black key is located rearward of that of a white key. In the keyboard device to which the above-described linkages are applied, if locations of virtual pivots of the white key and the black key are the same, it is sometimes impossible to obtain the same key operation as that of the keyboard of the acoustic grand piano. Thus, the keyboard device described above has room for improvement.

According to the construction of the keyboard device disclosed in Japanese Laid-Open Patent Publication (Kokai) No. 2016-191832, when mounting the hammer on the support shaft, a bearing portion of the hammer is positioned forward of the support shaft and the guide groove is engaged with the support shaft, whereafter the hammer is pressed afterward. With this, the hammer is moved rearward while being guided by the guide groove, in a state where the guide groove is pushed laterally outward by the support shaft. Then, the guide groove overcomes the support shaft and the holding hole is fitted on the support shaft, whereby the hammer is pivotally supported on the support shaft via the bearing portion.

Further, in a keyboard device disclosed in Japanese Laid-Open Patent Publication (Kokai) No. 2015-87591, a hammer includes a shaft hole fitted on a support shaft of a chassis and a guide groove continuous with the shaft hole and open downward, and the hammer is fitted on the support shaft from above via the guide groove.

During transportation of a keyboard device as a manufactured product, the keyboard device is often subject to impact mainly in the front-rear direction or in a vertical direction. However, in the keyboard device disclosed in Japanese Laid-Open Patent Publication (Kokai) No. 2016-191832, the hammer is fitted from a front side on the support shaft via the substantially horizontal guide groove. Therefore, e.g. during transportation of the keyboard device, when the impact in the front-rear direction acts on the keyboard device, a direction of inertial force due to the impact and a direction of fitting the hammer are almost the same, and therefore, even when a contracted portion is provided in the guide grove, there is a fear that the hammer is disengaged from the support shaft. Similarly, in the keyboard device disclosed in Japanese Laid-Open Patent Publication (Kokai) No. 2015-87591, since the hammer is fitted on the support shaft from above, when the impact in the vertical direction acts on the keyboard device, there is a fear that the hammer is disengaged from the support shaft.

Further, in the keyboard device disclosed in Japanese Laid-Open Patent Publication (Kokai) No. 2016-191832, when the hammer is removed for repair and maintenance, it is required to move the hammer forward relatively largely along the guide groove, which makes it difficult to remove the keyboard device.

SUMMARY OF THE INVENTION

It is an object of the present invention to provide a keyboard device for a keyboard instrument, which is capable of adjusting a touch weight felt during depression of a key and obtaining the same key operation as that of a keyboard of an acoustic grand piano, by setting an angle of pivotal movement of a hammer which is pivotally moved in a manner interlocked with depression of the key such that the angle varies depending on the type of the key.

It is another object of the present invention to provide a keyboard device for a keyboard instrument, which is capable of effectively preventing the hammer from being disengaged from a support shaft due to the action of impact and easily removing the hammer from the support shaft.

To attain the first-mentioned object described above, in a first aspect of the present invention there is provided a keyboard device for a keyboard instrument, including a keyboard chassis, a plurality of keys each extending in a front-rear direction and arranged side by side in a left-right direction on the keyboard chassis, and a plurality of hammers extending in the front-rear direction and provided in association with the plurality of keys, respectively, the hammers being pivotally supported, below the keys, on the keyboard chassis, each via a hammer support shaft, and arranged side by side in the left-right direction, for each being pivotally moved in a manner interlocked with depression of an associated one of the keys, wherein for a predetermined first hammer of the plurality of hammers, which is associated with a predetermined first key of the plurality of keys, and a predetermined second hammer of the plurality of hammers, which is associated with a predetermined second key of the plurality of keys, respective angles of pivotal movement, caused by key depression, of the first hammer and the second hammer are set to be different from each other.

With this construction, for the predetermined first hammer which is associated with the predetermined first key of the plurality of keys and the predetermined second hammer which is associated with the predetermined second key of the plurality of keys, the respective angles of pivotal movement, caused by key depression, of the first hammer and the second hammer are set to be different from each other. For example, when the angle of pivotal movement of the first hammer caused by key depression is set such that it is larger than that of the second hammer, a touch weight of the first key is heavier than that of the second key. Therefore, in the above-mentioned case, the first key and the first hammer are applied to a key and a hammer in a lower-pitched range, and the second key and the second hammer are applied to a key and a hammer in a higher-pitched range, whereby it is possible to make the touch weight of the key in the lower-pitched range heavier and make the touch weight of the key in the higher-pitched range lighter.

Further, in a keyboard device in which each key is pivotally moved about a virtual pivot located rearward of a rear end thereof, by setting the angle of pivotal movement of a hammer caused by depression of the key to be larger, it is possible to set the virtual pivot of a key associated with the hammer to a more rearward position, that is, make longer the length from a rear end of the key to the virtual pivot (hereinafter referred to as "the virtual pivot length"). For example, in a case where the angle of pivotal movement of the first hammer caused by key depression is set to be larger than that of the second hammer, it is possible to make the virtual pivot length of the first key longer than that of the second key. Therefore, in the above-mentioned case, the first key and the first hammer are applied to a black key and a hammer associated therewith, and the second key and a hammer associated therewith are applied to a white key and a hammer associated therewith, whereby the virtual pivot length of the black key can be made longer than that of the white key.

As described above, according to the keyboard device of the present invention, the angle of pivotal movement of a hammer which is pivotally moved in a manner interlocked with key depression is set such that it varies depending on the type of the key, whereby it is possible to adjust a touch weight felt during depression of the key and the virtual pivot length of the key, depending on the type of the key, so that it is possible to obtain the same key operation as that of the acoustic grand piano.

Preferably, each key and each hammer associated with the key are provided with a key-side engagement portion and a hammer-side engagement portion, respectively, for engagement with each other, one of the key-side engagement portion and the hammer-side engagement portion including an engagement recess extending in the front-rear direction, the other of the key-side engagement portion and the hammer-side engagement portion including an engagement shaft that extends in the left-right direction and is pivotally and slidably engaged with the engagement recess, and wherein in a key-released state, an inclination of an extension direction of the engagement recess of the first key or the first hammer, and an inclination of an extension direction of the engagement recess of the second key or the second hammer are set to be different from each other.

With the construction of this preferred embodiment, each key and each hammer associated with the key are provided with the key-side engagement portion and the hammer-side engagement portion, respectively, for engagement with each other. Further, one of the key-side engagement portion and the hammer-side engagement portion includes the engagement recess extending in the front-rear direction, and the other of the key-side engagement portion and the hammer-side engagement portion includes the engagement shaft engaged with the engagement recess. Further, the inclination of the extension direction of the engagement recess of the first key or the first hammer, and the inclination of the extension direction of the engagement recess of the second key or the second hammer are set to be different from each other. As described hereinafter, by setting the inclination of the extension direction of each engagement recess such that it varies depending on the type of the key, it is possible to easily adjust the angle of pivotal movement of the hammer which is pivotally moved in a manner interlocked with key depression, depending on each type of key.

Preferably, the keyboard device further includes a plurality of connecting arms each extending in the front-rear direction and arranged side by side in the left-right direction in association with the plurality of keys, respectively, each connecting arm being pivotally supported on the keyboard chassis via an arm support shaft between an associated one of the keys and a hammer associated with the key, and having a front end pivotally and slidably connected to a predetermined portion of the hammer and a rear end pivotally connected to a rear end of the key, for being pivotally moved in a manner interlocked with depression of the key.

With the construction of this preferred embodiment, each connecting arm extending in the front-rear direction is pivotally connected to the keyboard chassis via the arm support shaft. Further, the front end of the connecting arm is pivotally and slidably connected to the predetermined portion of the hammer, and the rear end of the connecting arm is pivotally connected to the rear end of the key. The connecting arm thus configured is provided between each key and each hammer and is pivotally moved in a manner interlocked with key depression, whereby it is possible to easily obtain a keyboard device provided with keys each pivotally moved about a virtual pivot.

Preferably, the keyboard device further includes a plurality of connecting arms each extending in the front-rear direction and arranged side by side in the left-right direction in association with the plurality of keys, respectively, each connecting arm being pivotally supported on the keyboard chassis via an arm support shaft between an associated one of the keys and a hammer associated with the key, and having a front end pivotally and slidably connected to a predetermined portion of the hammer and a rear end pivotally connected to a rear end of the key, for being pivotally moved in a manner interlocked with depression of the key, and a first arm support shaft which is associated with the first key and supports a predetermined first connecting arm of the plurality of connecting arms, and a second arm support shaft which is associated with the second key and supports a predetermined second connecting arm of the plurality of connecting arms, are provided in a state displaced from each other in a predetermined direction by a predetermined length.

With the construction of this preferred embodiment, the keyboard device includes a plurality of connecting arms configured similar to the above-described ones, and the first arm support shaft which is associated with the first key and supports the first connecting arm and the second arm support shaft which is associated with the second key and supports the second connecting arm are provided in the state displaced from each other in the predetermined direction by the predetermined length. With this, the respective angles of pivotal movement of the first and second connecting arms pivotally moved in a manner interlocked with key depression are different, and accordingly, the angle of pivotal movement, caused by key depression, of the first hammer connected to the first connecting arm and the angle of pivotal movement, caused by key depression, of the second hammer connected to the second connecting arm are also different. Thus, in the keyboard device provided with keys each pivotally moved about a virtual pivot, by providing the first and second arm support shafts at locations different from each other, it is possible to easily adjust the angle of pivotal movement of the hammer which is pivotally moved in a manner interlocked with key depression, depending on each type of key.

More preferably, a first hammer support shaft supporting the first hammer and a second hammer support shaft supporting the second hammer are provided in a state displaced from each other in a predetermined direction by a predetermined length.

With the construction of this preferred embodiment, the first hammer support shaft supporting the first hammer and the second hammer support shaft supporting the second hammer are provided in the state displaced from each other in the predetermined direction by the predetermined length. With this, the angle of pivotal movement caused by key depression is different between the first hammer and the second hammer, whereby with combination the construction described above, it is possible to increase the difference in the angle of pivotal movement of the hammer depending on each type of key.

Preferably, for the first hammer, the angle of pivotal movement thereof caused by key depression is set to be larger than that of the second hammer, the first key is set as a black key, and the second key is set as a white key.

With the construction of this preferred embodiment, the angle of pivotal movement of the first hammer caused by key depression is set such that it is larger than that of the second hammer. With this, in the keyboard device in which each key is pivotally moved about a virtual pivot located rearward of the rear end thereof, the virtual pivot length of the first key associated with the first hammer becomes longer than that of the second key associated with the second hammer. Therefore, by setting the first key as a black key and the second key as a white key, the virtual pivot length of the black key can be made longer than that of the white key, so that the relationship between the virtual pivot length of the black key and that of the white key can be made similar to the relationship therebetween in the keyboard of the acoustic grand piano.

Preferably, for the first hammer, the angle of pivotal movement thereof caused by key depression is set to be larger than that of the second hammer, the first key is set as a key in a lower-pitched range of the keyboard device, and the second key is set as a key in a higher-pitched range of the keyboard device.

With the construction of this preferred embodiment, similar to the above, the angle of pivotal movement of the first hammer caused by depression of the first key is set such that it is larger than that of the second hammer, whereby the touch weight of the first key associated with the first hammer is heavier than that of the second key associated with the second hammer. Therefore, by setting the first key as a key in the lower-pitched range of the keyboard device, and the second key as a key in the higher-pitched range of the keyboard device, it is possible to make the touch weight of the key in the lower-pitched range heavier than that of the key in the higher-pitched range. As a consequent, the relationship between the touch weight of the key in the lower-pitched range and that of the key in the higher-pitched range can be made similar to the relationship therebetween in the keyboard of the acoustic grand piano.

To attain the second-mentioned object described above, in a second aspect of the present invention, there is provided a keyboard device for a keyboard instrument, including a chassis, a key which is pivotally movable, and a hammer pivotally supported on a support shaft of the chassis, for being pivotally moved in a manner interlocked with the key which is depressed, wherein the hammer includes a shaft hole which can be fitted on the support shaft, and a guide groove which extends obliquely upward from a lower surface of the hammer such that the guide groove is continuous with the shaft hole and has a groove width smaller than a diameter of the support shaft, the guide groove guiding the shaft hole to the support shaft when the hammer is attached to the support shaft.

With this construction, when the hammer is mounted on the support shaft, the shaft hole and the guide groove of the hammer are positioned obliquely above the support shaft, and the guide groove is engaged with the support shaft, whereafter the hammer is pressed obliquely downward along the guide groove. With this, the hammer is moved obliquely downward while being guided by the guide groove, in a state where the guide groove having a narrow width is elastically pushed laterally outward by the support shaft. Then, when the guide groove overcomes the support shaft, the guide groove elastically returns to an original state thereof and at the same time the shaft hole is fitted (snap-fitted) on the support shaft. With this, the hammer is mounted on the support shaft via the shaft hole and is pivotally supported thereon.

As described above, the hammer is snap-fitted on the support shaft via the shaft hole. Further, the guide groove extends obliquely from a lower surface of the hammer to the shaft hole. For this reason, e.g. during transportation of a keyboard device as a manufactured product, when impact in the front-rear direction or in a vertical direction acts on the keyboard device, a direction of inertial force due to the impact is largely different from the direction of the guide groove, whereby the inertial force is dispersed. As a result, when impact acts on the keyboard device, it is possible to effectively suppress disengagement of the hammer from the support shaft.

Preferably, in a key-released state of the key, the guide groove extends obliquely at an angle of 45±15 degrees with respect to horizontal.

If the inclination angle of the guide groove with respect to horizontal is larger than 60 degrees, the inclination of the guide groove is closer to vertical, which causes insufficient dispersion of inertial force when the impact in the vertical direction acts. On the other hand, if the inclination angle of the guide groove is smaller than 30 degrees, the inclination of the guide groove is closer to horizontal, which causes insufficient dispersion of inertial force when the impact in the front-rear direction acts. With this construction, the inclination angle of the guide groove with respect to horizontal is 45±15 degrees, and therefore by sufficiently dispersing the inertial force due to the impact, it is possible to effectively suppress disengagement of the hammer from the support shafts.

Preferably, the hammer is formed with a recessed and protruded portion for engagement with a tool for causing the hammer to be moved obliquely upward from the support shaft, for removal.

In the keyboard device described above, since the hammer is snap-fitted on the support shaft, removal of the hammer for repair is difficult to perform. With this construction, however, the hammer is formed with the recessed and protruded portion, and by operating a tool engaged with the recessed and protruded portion to cause the hammer to be obliquely moved upward, i.e. in the extension direction of the guide groove, it is possible to easily remove the hammer from the support shafts.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key at a left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIGS. 7A and 7B are views useful in explaining operation of the black key in the keyboard device, in which FIG. 7A shows a key-released state and FIG. 7B shows a key-depressed state;

FIGS. 8A to 8D are views useful in explaining an essential part of a first aspect of the present invention, in which FIG. 8A is a side cross-sectional view of the white key, FIG. 8B is a view of a connecting recess of a key front-side connecting portion of the white key on an enlarged scale, FIG. 8C is a side cross-sectional view of the black key, and FIG. 8D is a view of a connecting recess of a key front-side connecting portion of the black key on an enlarged scale;

FIGS. 9A to 9D are views useful in explaining a length between a rear end of a key and a virtual pivot, in which FIG. 9A is a side cross-sectional view of the keyboard device with the focus on a white key, FIG. 9B is a view of the connecting recess of the white key on an enlarged scale, FIG. 9C is a side cross-sectional view of the keyboard device with the focus on a black key, and FIG. 9D is a view of the connecting recess of the black key on an enlarged scale;

FIGS. 10A and 10B are schematic views useful in explaining the operating principle of the keyboard device where a virtual pivot length of the black key becomes longer than that of the white key, in which FIG. 10A shows the white key and the key support mechanism therefor in the key-released state, and FIG. 10B shows the black key and the key support mechanism therefor in the key-released state;

FIGS. 11A and 11B are schematic views useful in explaining the operating principle of the keyboard device, which is continued from FIGS. 10A and 10B, in which FIG. 11A shows the white key and the key support mechanism therefor in the key-depressed state, and FIG. 11B shows the black key and the key support mechanism therefor in the key-depressed state;

FIGS. 12A to 12D are views similar to FIGS. 9A to 9D, in which FIG. 12A is a side cross-sectional view of the keyboard device with the focus on a white key in a higher-pitched range, FIG. 12B is a view of a connecting recess of the white key appearing in FIG. 12A on an enlarged scale, FIG. 12C is a side cross-sectional view of the keyboard device with the focus on a white key in a lower-pitched range as an essential component, and FIG. 12D is a view of a connecting recess of the white key appearing in FIG. 12C on an enlarged scale;

FIGS. 14A to 14C are views useful in explaining a keyboard device of another embodiment, in which the angle of pivotal movement of a first arm caused by key depression is set such that it varies depending on the type of the depressed key, in which FIG. 14A is a side cross-sectional view of the keyboard device with the focus on the white key, FIG. 14B is a view of second pivot shafts that support a second arm and components therearound on an enlarged scale, and FIG. 14C is a view of a first pivot shaft that supports the first arm and components therearound on an enlarged scale;

FIGS. 15A and 15B are schematic views useful in explaining an essential part of a second aspect of the present invention, in which FIG. 15A shows a state of a bearing portion of the first arm and a first pivot shaft supporting the bearing portion before the first arm is mounted on the first pivot shaft, on an enlarged scale, and FIG. 15B shows a state of the bearing portion and the first pivot shaft after the first arm has been mounted on the first pivot shaft, on an enlarged scale;

DETAILED DESCRIPTION OF PREFERRED EMBODIMENTS

Figure 1A:
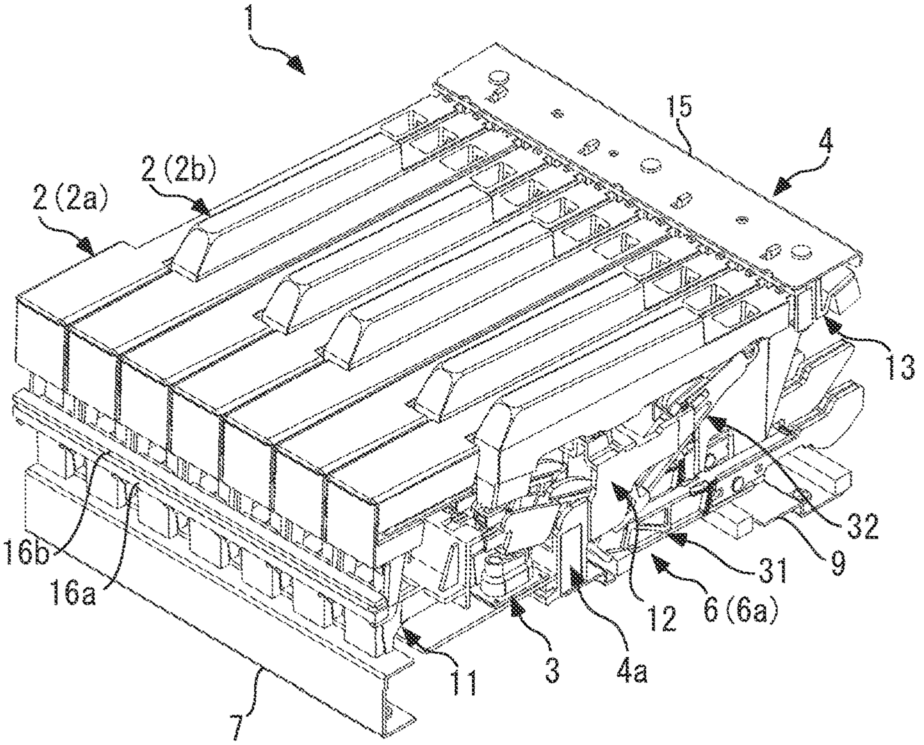

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic construction of the keyboard device 1 and operation thereof, and then of an essential part of a first aspect and an essential part of a second aspect of the present invention.

Figure 1B:
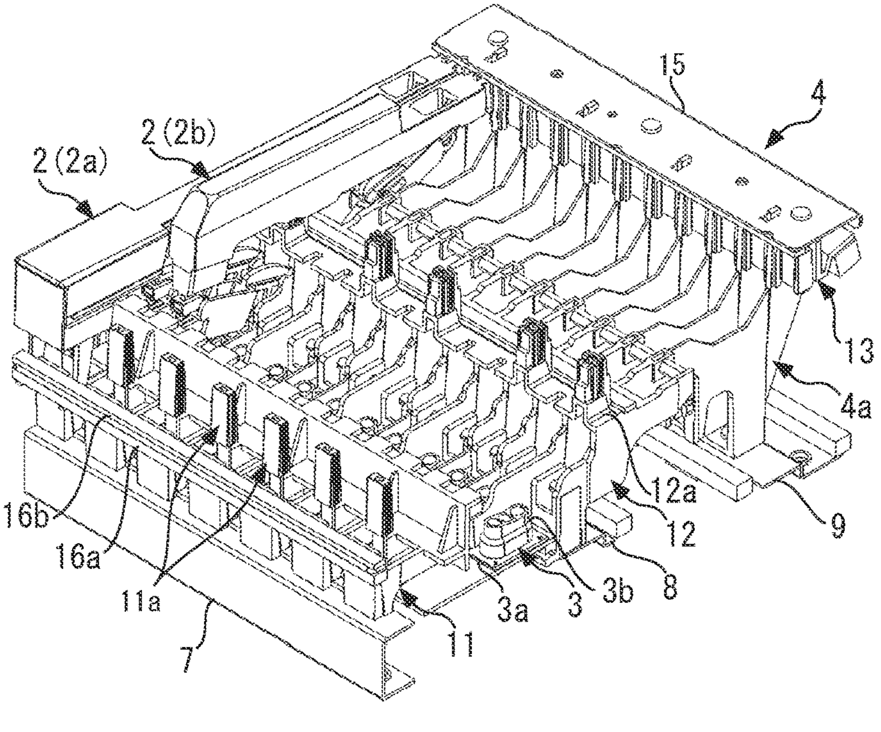
Figure 2:
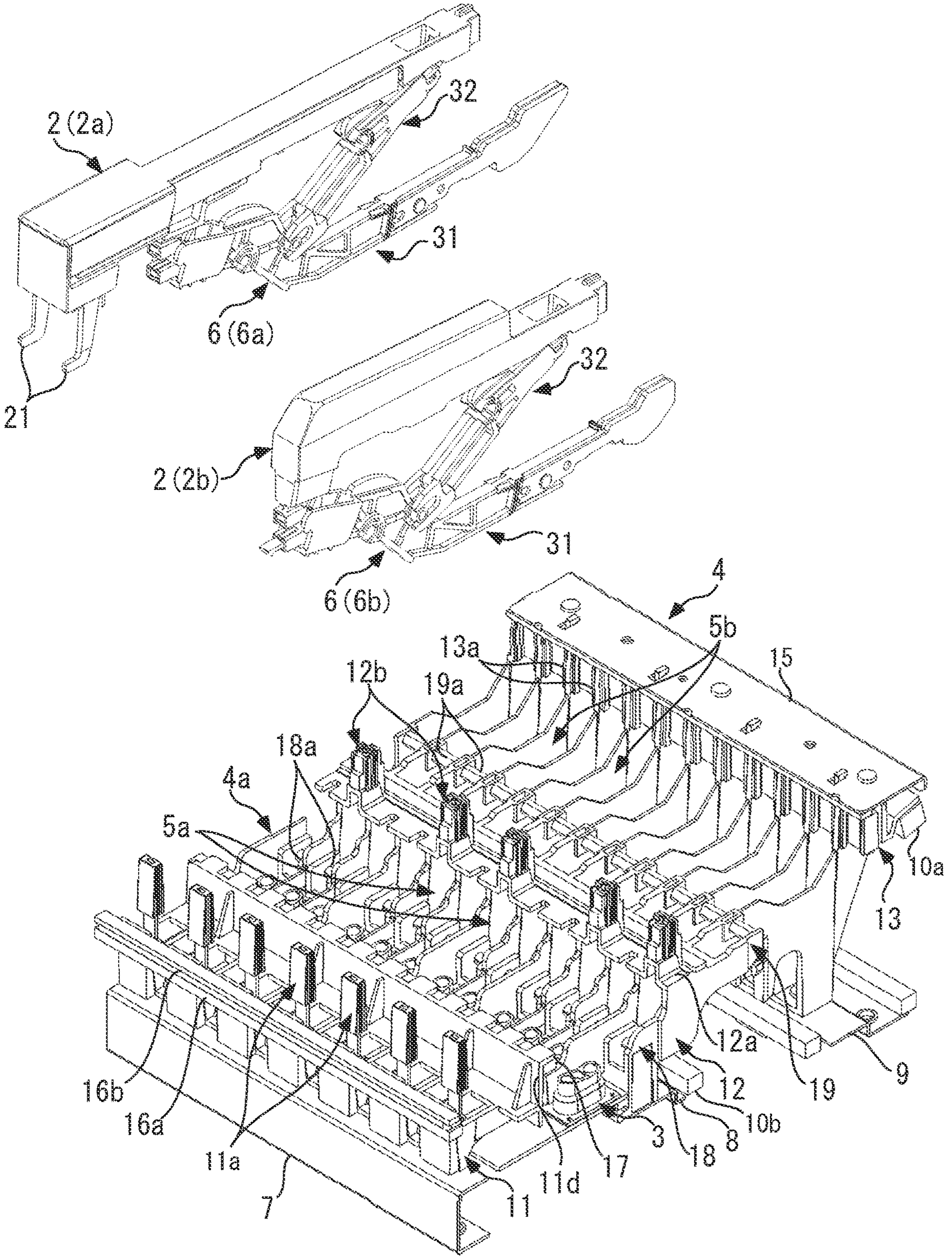
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2*a* and a black key 2*b* at the left end of the keyboard device 1 are omitted. FIG. 2 shows a state of the keyboard device 1 shown in FIG. 1B, in which the white key 2*a* and the black key 2*b* are removed, together with respective key support mechanisms 6 therefor, from a keyboard chassis 4.

This keyboard device 1 is comprised of the keyboard chassis 4, the plurality of keys 2 including the white keys 2*a* and the black keys 2*b* and arranged in a state arranged side by side in a left-right direction, the plurality of key support mechanisms 6 each pivotally mounted on the keyboard chassis 4, for supporting an associated one of the keys 2 from below, and key switches 3 each for detecting key depression information of an associated one of the keys 2.

Figure 3A:
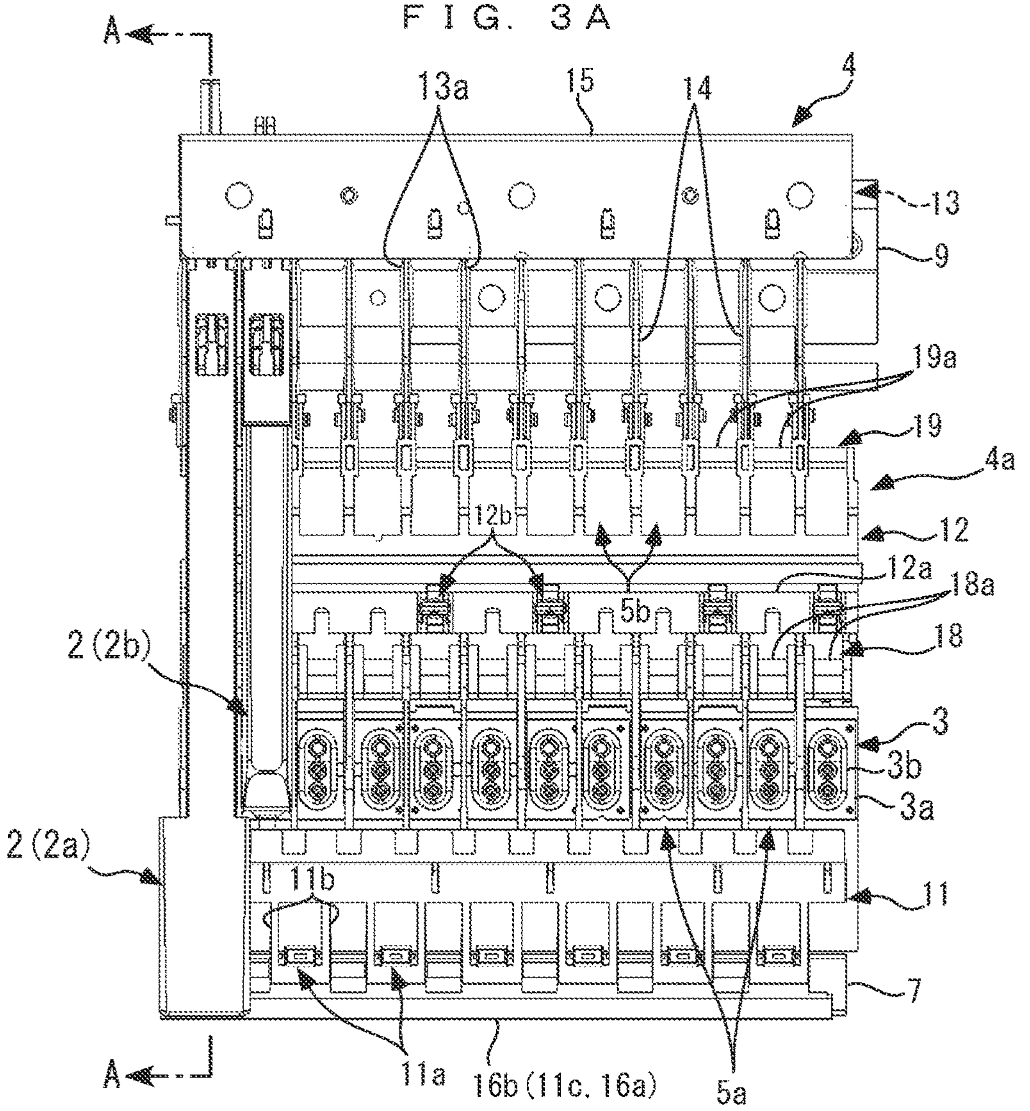
FIG. 3A is a plan view of the keyboard device shown in FIG. 1B
Figure 3B:
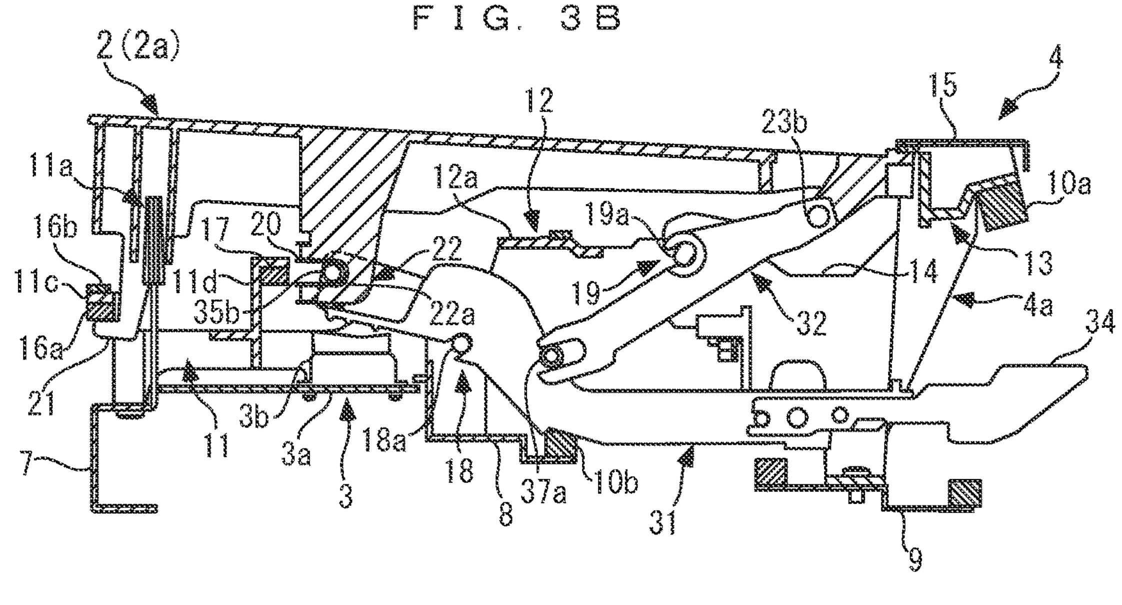
FIG. 3B is a cross-sectional view taken along line A-A of FIG. 3A.

The keyboard chassis 4 includes a chassis body 4*a* formed as a resin molded article which is made e.g. by injection molding of a predetermined resin material (e.g. an ABS resin) into a predetermined shape. As shown in FIGS. 3A and 3B, the chassis body 4*a* has a front portion 11, an intermediate portion 12, and a rear portion 13, each extending in the left-right direction (in a left-right direction as viewed in FIG. 3A) as a whole. The front portion 11, the intermediate portion 12, and the rear portion 13 are integrally formed with each other via a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direction, is provided at a predetermined location of the chassis front 11, rearward of each white key guide 11*a*, and that a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts (support shafts) 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts (support shafts) 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Note that a first arm lower limit stopper 10*b* extending along the entirety of the chassis body 4*a* in the left-right direction is provided at a predetermined location of a middle rail 8, referred to hereinafter, disposed below the chassis intermediate 12.

Further, the above-mentioned key switches 3 are provided on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the first arm lower limit stopper 10*b* provided on the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIGS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other so as to be arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the front rail 7 and the rear rail 9.

Figure 4A:
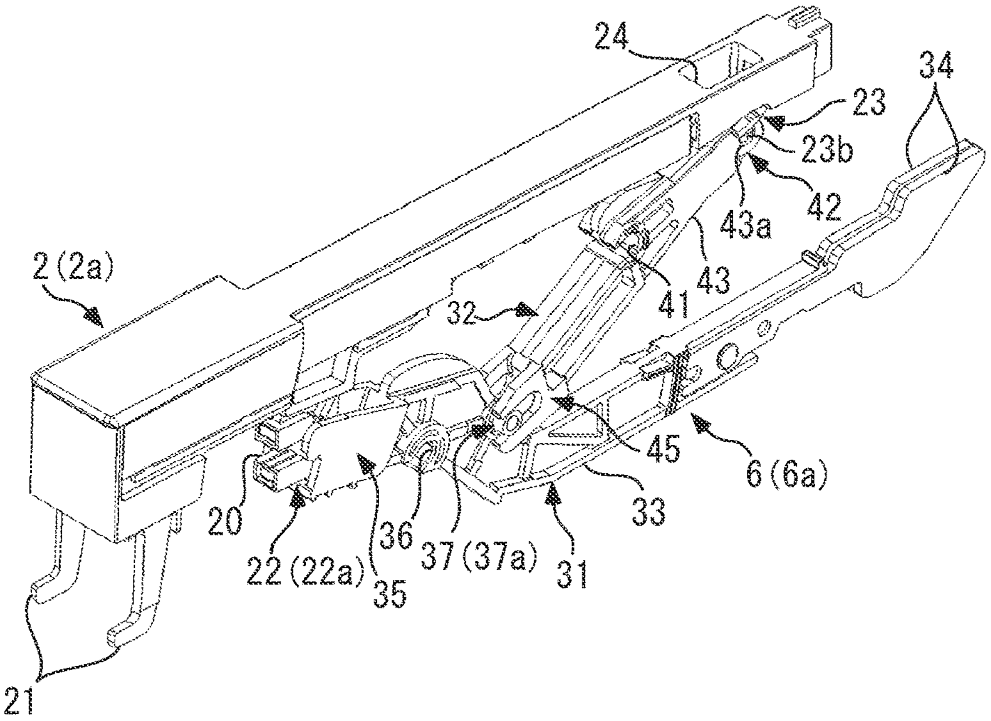
Figure 4B:
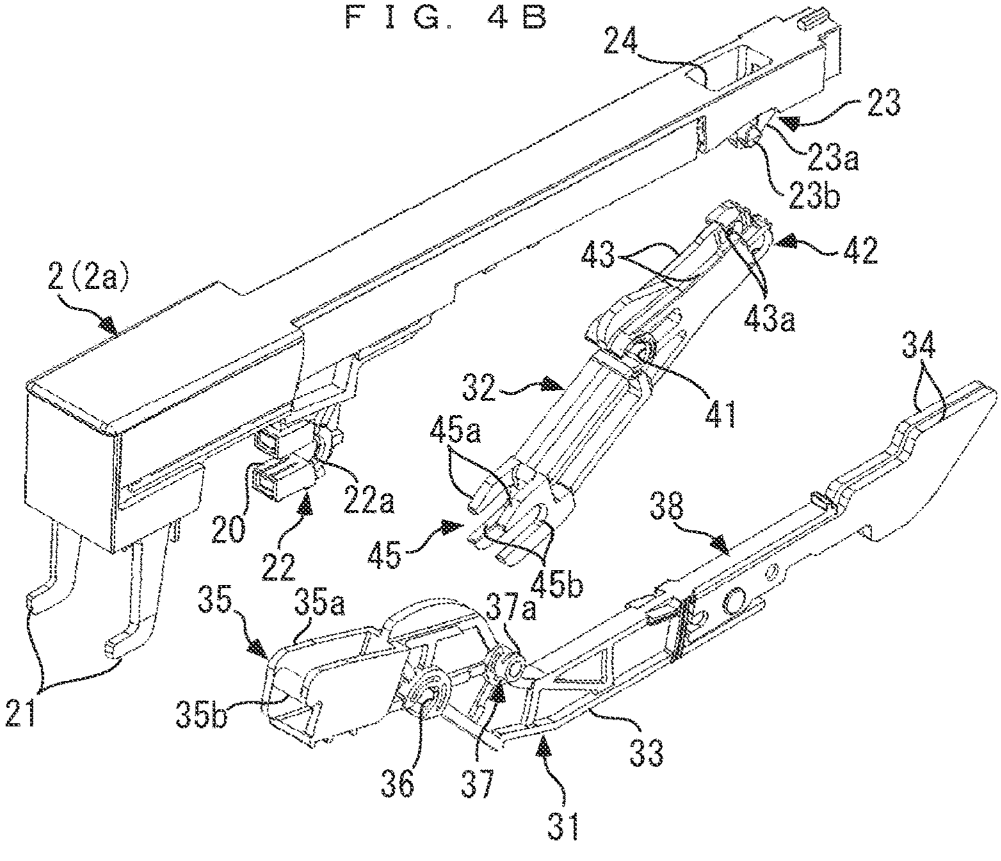

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed e.g. by injection molding of a predetermined resin material (e.g. an AS resin) into a hollow shape which extends a predetermined length in the front-rear direction and opens downward. The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of a front portion of the white key 2*a*, rearward of the upper limit position regulation portions 21, there is formed a key front-side connecting portion 22 connected to the first arm 31 of the key support mechanism 6*a*. This key front-side connecting portion 22 includes a connecting recess (engagement recess) 22*a* which has a U shape having a slot-like shape in side view and open forward. Further, the connecting recess 22*a* has a cushioning member (key-side noise suppressing member) 20 attached thereto, which is formed to cover the whole inner peripheral surface of the connecting recess 22*a*, for suppressing generation of noise when a connecting shaft 35*b*, referred to hereinafter, of the first arm 31 slides in the inner peripheral surface of the connecting recess 22*a*.

Furthermore, the white key 2*a* has a rear portion thereof provided with a key rear-side connecting portion 23 connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engagement protrusions 23*b* and 23*b* which coaxially protrude from the left and right side surfaces of the connecting body portion 23*a*, respectively. Further, a rear portion of the white key 2*a* is formed with a tool insertion hole 24 which vertically extends through the rear portion, and is used to insert a predetermined tool from above for disconnecting the white key 2*a* from the second arm 32 of the key support mechanism 6*a* e.g. for maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively.

As shown in FIG. 4B, the first arm 31 is comprised of an arm body 33 and two weights 34 and 34 attached to the arm body 33. The arm body 33 is formed as a resin molded article which is made e.g. by injection molding of a predetermined resin material (e.g. polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37, which is connected to the second arm 32, at a predetermined location rearward of the bearing portion 36. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g. by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view at about a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 is formed into a bifurcated shape, and has two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* has an associated one of the engagement protrusions 23*b* of the key rear-side connecting portion 23 pivotally fitted therein.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
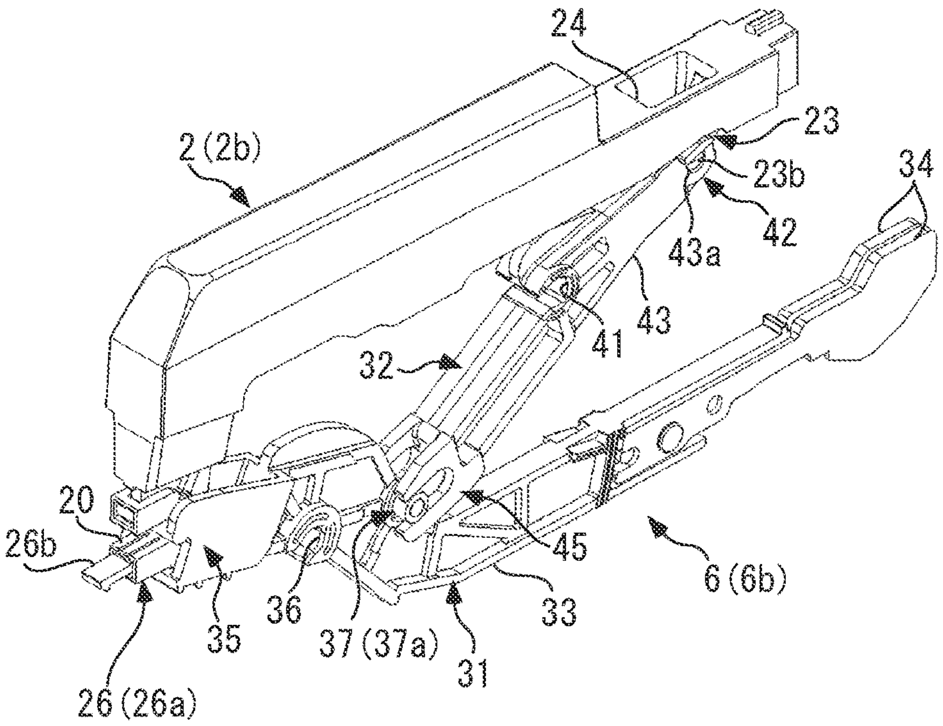
Figure 5B:
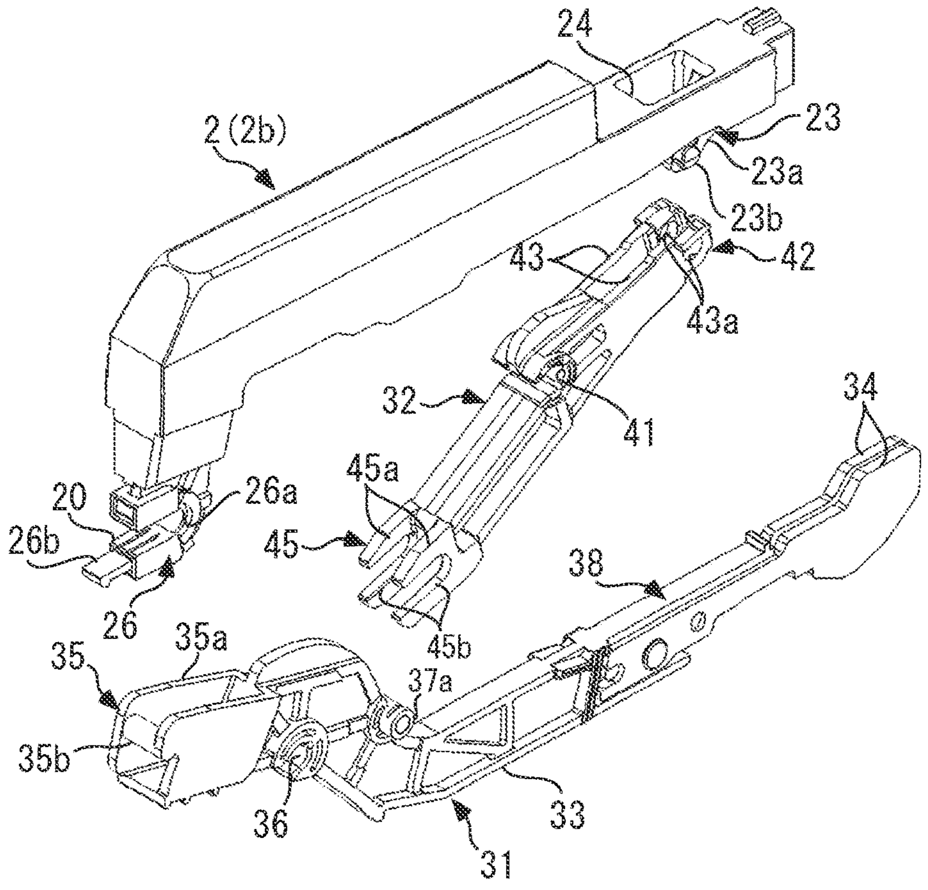

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g. by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess (engagement recess) 26*a* which has a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that two left and right weights 34 and 34 of the black key-associated key support mechanism 6*b* differ from the weights 34 of the white key-associated key support mechanism 6*a* in the shape of the rear portion thereof.

Figure 6A:
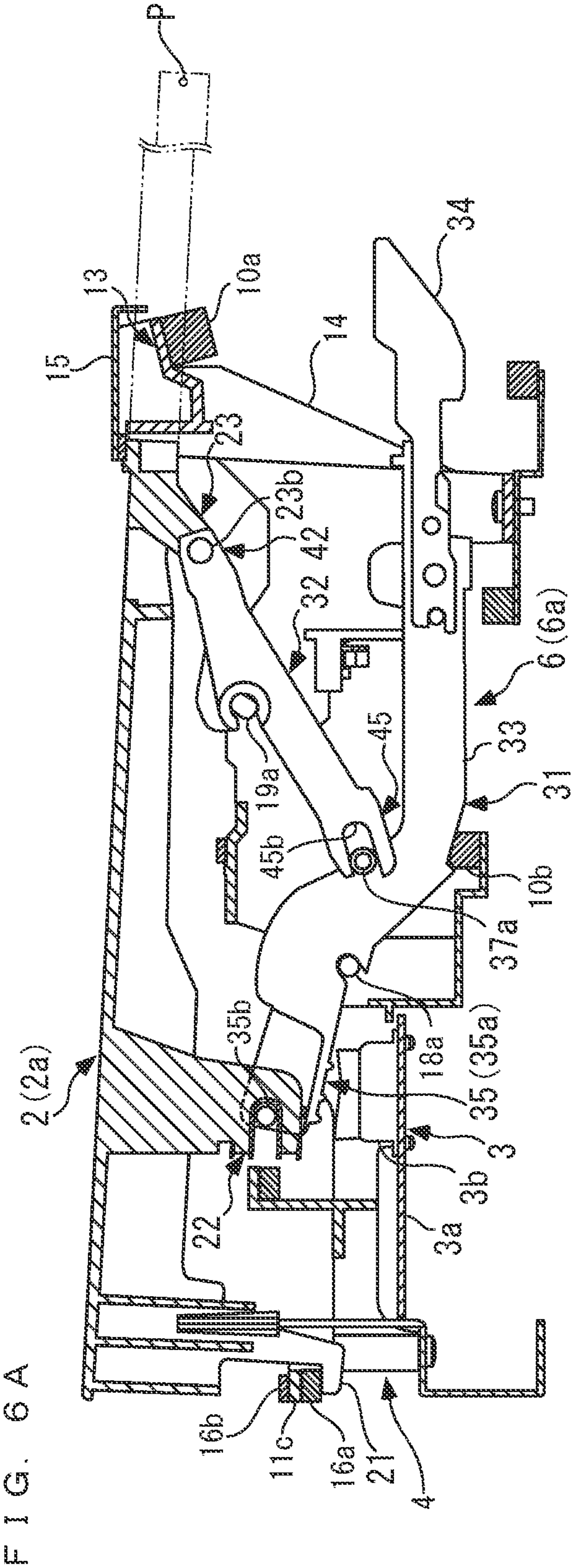
Figure 6B:
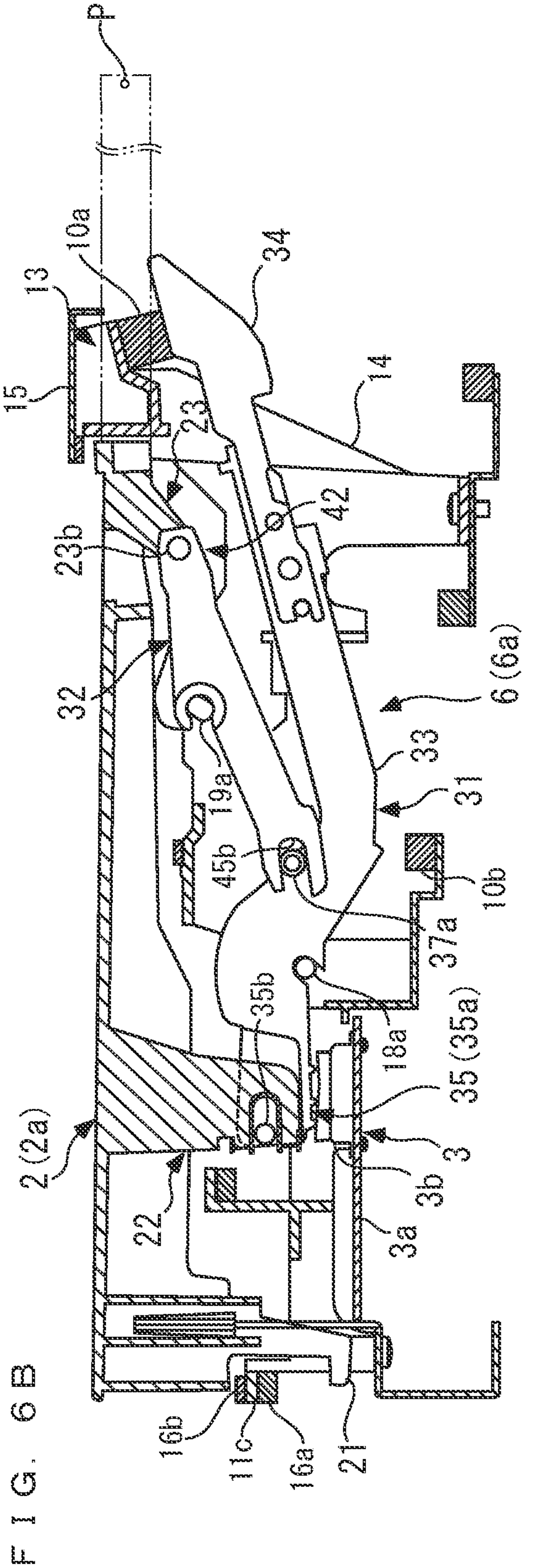
Figure 7A:
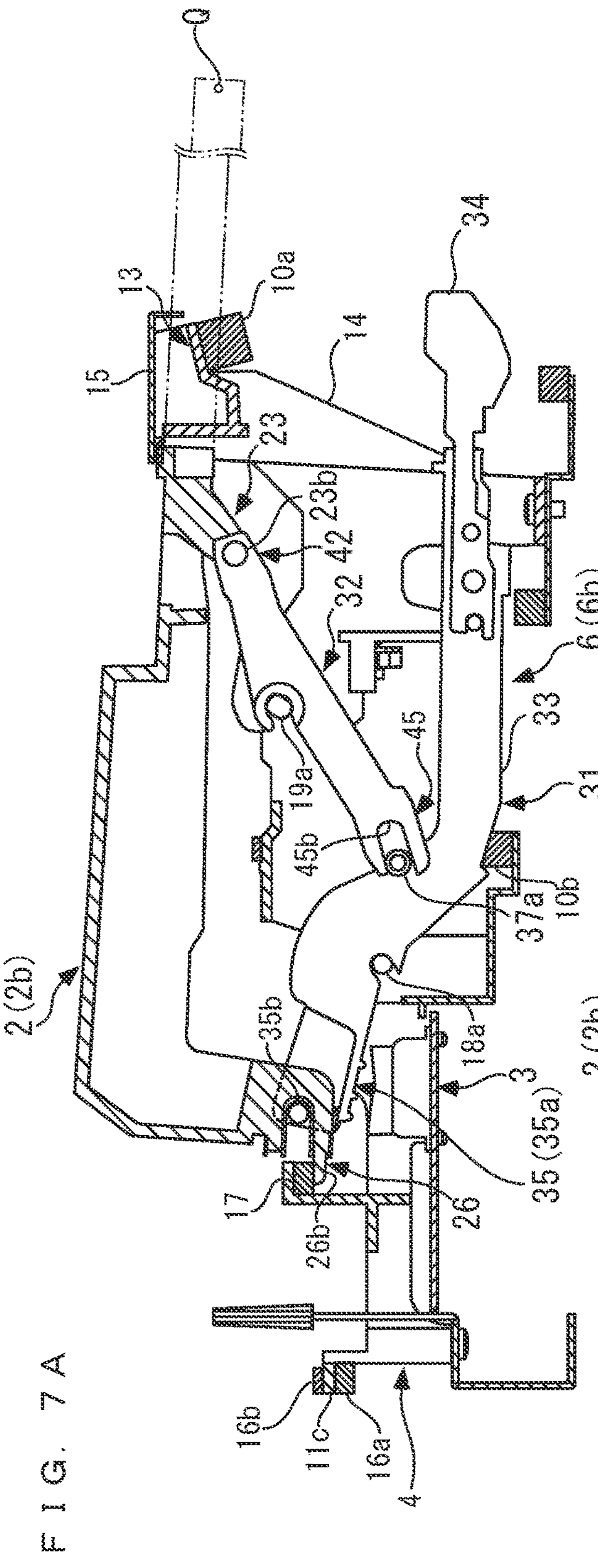
Figure 7B:
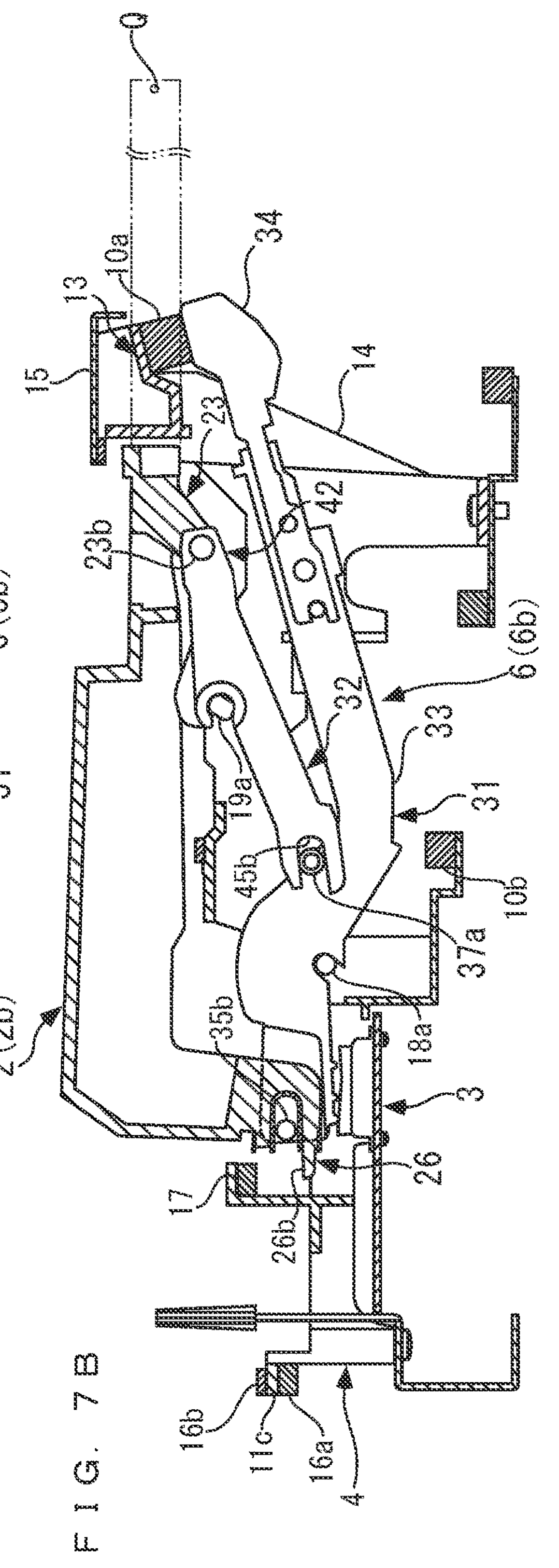

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith. FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* is moved downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b*, is moved upward. With this, the second arm 32 is pivotally moved in a clockwise direction about the second pivot shaft 19*a*. Then, in accordance with this pivotal movement of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting portion 35 is moved downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described hereinabove, in the case where the white key 2*a* is depressed, in accordance with the counterclockwise pivotal movement of the first arm 31, the weight 34 of the first arm 31 is tilted such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b*, which blocks further depression of the white key 2*a*.

The white key 2*a* depressed as above operates such that it pivotally moves about a virtual pivot P located rearward of the rear end thereof. The location of the virtual pivot P is set such that a distance from the front end of the white key 2*a* becomes approximately twice as long as the length of the white key 2*a* itself, for example. With this, when the front end of the white key 2*a* is depressed to the lowest position, compared with the case where the white key 2*a* is in the key-released state shown in FIG. 6A, the front end of the white key 2*a* is positioned lower by a predetermined key stroke (e.g. 10 mm) and the rear end of the white key 2*a* is located lower by a distance (e.g. 5 mm), which is approximately half of the above key stroke.

On the other hand, when the finger is released from the white key 2*a* being depressed, the first arm 31 of the key support mechanism 6*a* pivotally moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a*, moves into contact with the first arm lower limit stopper 10*b* from above, and both of the upper limit position regulation portions 21 and 21 of the white key 2*a* move into contact with the key upper limit stopper 16*a* from below, whereby further pivotal movement of the white key 2*a* is blocked and the white key 2*a* returns to its original key-released state.

Further, operation in response to depression of the black key 2*b* is performed similar to the above-described operations of the white key 2*a* and the key support mechanism 6*a* in response to depression of the white key 2*a*. More specifically, when a front end of the black key 2*b* is depressed from a key-released state shown in FIG. 7A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* operates such that it pivotally moves about a virtual pivot Q located rearward of the rear end thereof. Note that similar to the above-mentioned virtual pivot P of the white key 2*a*, the location of the virtual pivot Q is set such that a distance from the front end of the black key 2*b* becomes approximately twice as long as the length of the black key 2*b* itself, for example. Therefore, when the front end of the black key 2*b* is depressed to its lowest position, compared with a case where the black key 2*b* is in the key-released state shown in FIG. 7A, the front end of the black key 2*b* is positioned lower by a predetermined key stroke and the rear end thereof is positioned lower by a distance which is approximately half of the above key stroke.

On the other hand, when the finger is released from the black key 2*b* having been depressed, the first arm 31 and the second arm 32 of the key support mechanism 6*b* pivotally move in respective directions opposite to the above-mentioned directions, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the first aspect of the present invention will be described with reference to FIGS. 8A to 14C. The essential part of the first aspect of the present invention is that the angle of pivotal movement of the first arm 31 (hammer) caused by depression of the key 2 is set such that it varies depending on the type of the depressed key 2. More specifically, for the white key 2*a* (second key) and the black key 2*b* (first key), or for a key 2 in a higher-pitched range (second key) and a key 2 in a lower-pitched range (first key), the angles of pivotal movement of the first arms 31 of the associated key support mechanisms 6, caused by key depression, are set such that they differ from each other.

Figures 8A, 8B, 8C, 8D:
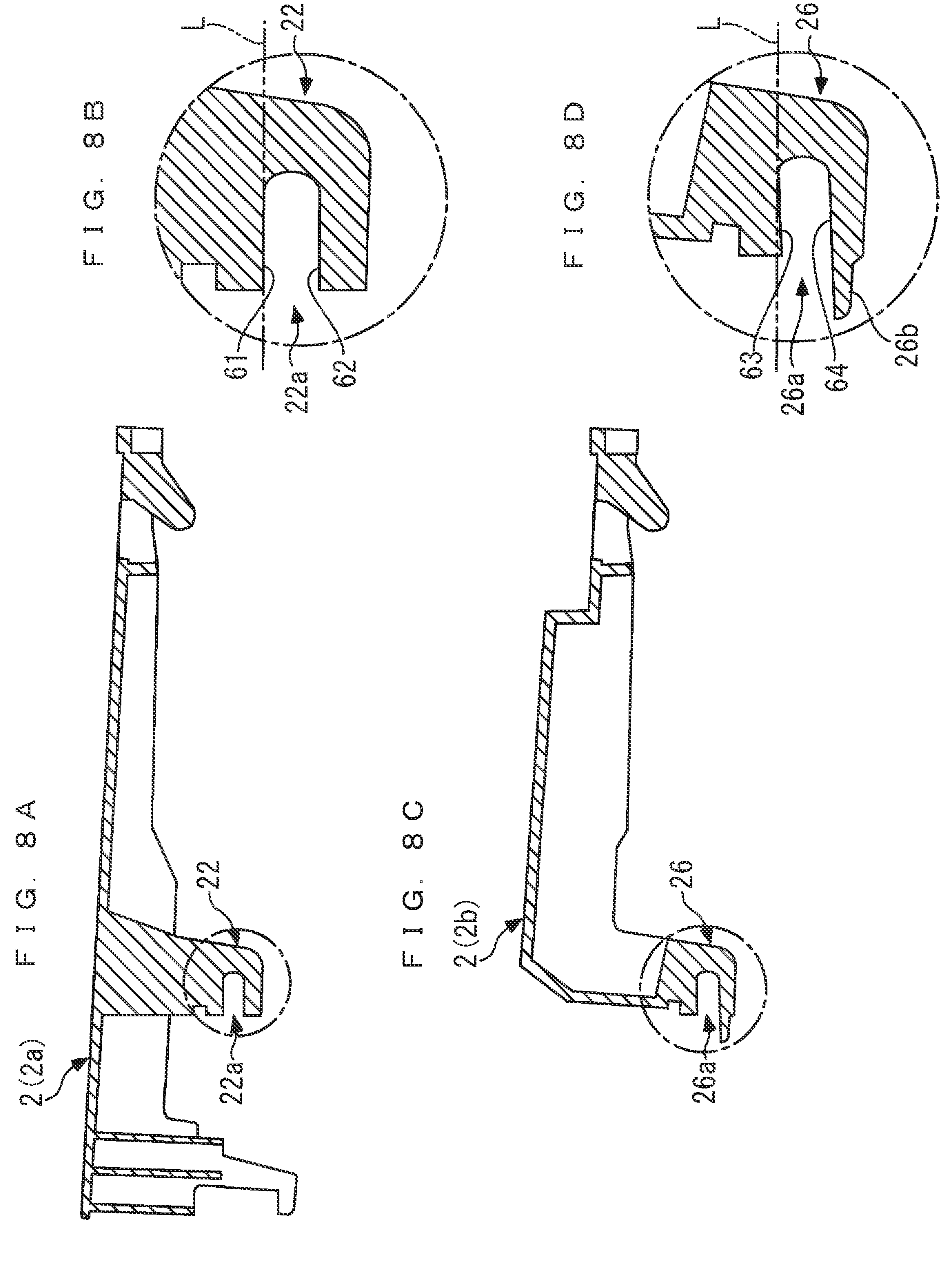

First, a description is given of a case where for the white key 2*a* and the black key 2*b*, the angles of pivotal movement of the first arms 31 and 31 of the respective associated key support mechanisms 6*a* and 6*b*, caused by key depression, are set such that they differ from each other. FIG. 8A is a side cross-sectional view of the white key 2*a*, and FIG. 8B is a view of the connecting recess 22*a* of the key front-side connecting portion 22 of the white key 2*a* on an enlarged scale. On the other hand, FIG. 8C is a side cross-sectional view of the black key 2*b*, and FIG. 8D is a view of the connecting recess 26*a* of the key front-side connecting portion 26 of the black key 2*b* on an enlarged scale. Note that as described hereinabove, although the cushioning members 20 for suppressing generation of noise during key depression are attached to the respective connecting recesses 22*a* and 26*a* of the white key 2*a* and the black key 2*b*, the following description is given by omitting the description of the cushioning members 20.

As shown in FIG. 8B, the connecting recess 22*a* of the white key 2*a* includes an upper surface 61 and a bottom surface 62 which are opposed to each other in the vertical direction with a predetermined distance therebetween and extend parallel to each other in the front-rear direction (in a left-right direction as viewed in FIG. 8B). This connecting recess 22*a* is formed by the above-mentioned the upper surface 61 and the bottom surface 62 such that the connecting recess 22*a* extends in the front-rear direction along a reference line L which substantially horizontally extends in the key-released state. That is, the inclination of the connecting recess 22*a* in an extension direction thereof coincides with the reference line L. Note that in FIG. 8B, to make it easy to understand the inclination of the connecting recess 22*a* in the extension direction thereof, the reference line L is shown in a state aligned with the upper surface 61, and the same applies to other figures described hereinafter.

On the other hand, as shown in FIGS. 8C and 8D, the connecting recess 26*a* of the black key 2*b* includes an upper surface 63 and a bottom surface 64 similar to the upper and bottom surfaces 61 and 62 of the connecting recess 22*a* of the white key 2*a*. Further, the connecting recess 26*a* of the black key 2*b* is configured to slope downward as it extends forward (slope downward to the left as viewed in FIG. 8D) at a predetermined angle (e.g. one to two degrees) with respect to the above-mentioned reference line L. That is, the extension direction of the connecting recess 26*a* is more inclined downward toward the front than that of the connecting recess 22*a* of the white key 2*a*.

Figure 9A:
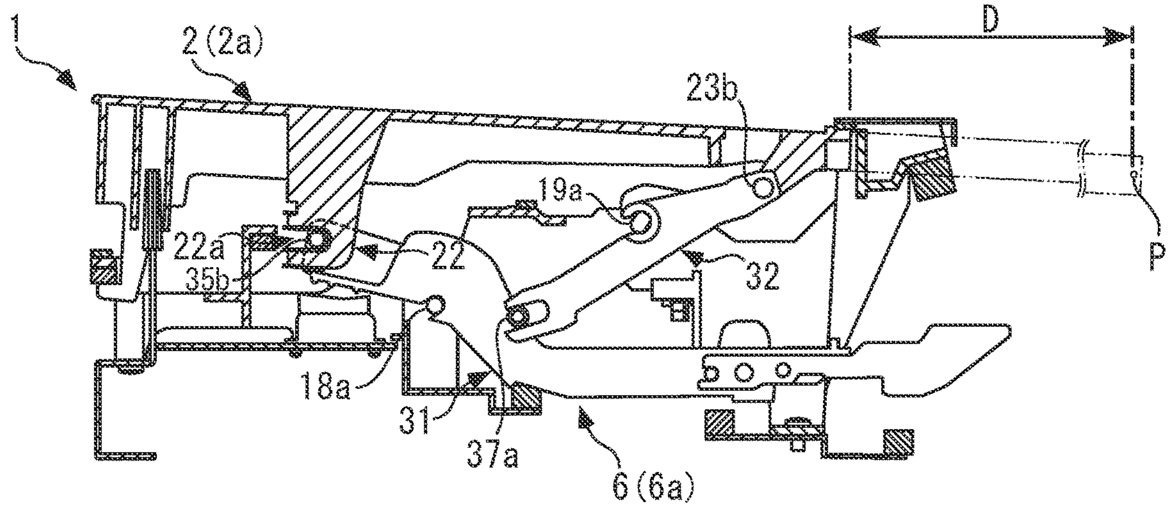
Figure 9B:
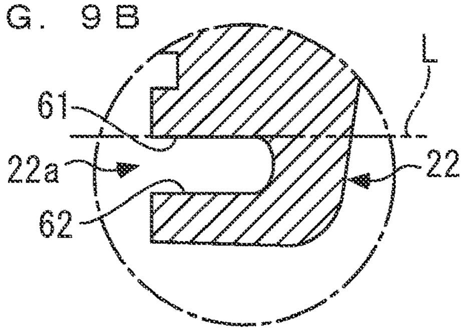

FIG. 9A is a side cross-sectional view of the keyboard device 1 with the focus on the white key 2*a*, FIG. 9B shows the connecting recess 22*a* of the white key 2*a* on an enlarged scale. As described above, during key depression, the white key 2*a* operates such that it pivotally moves about the virtual pivot P appearing in FIG. 9A. In this case, the virtual pivot length, which is a length from the rear end of the white key 2*a* to the virtual pivot P, is a length D.

Figure 9C:
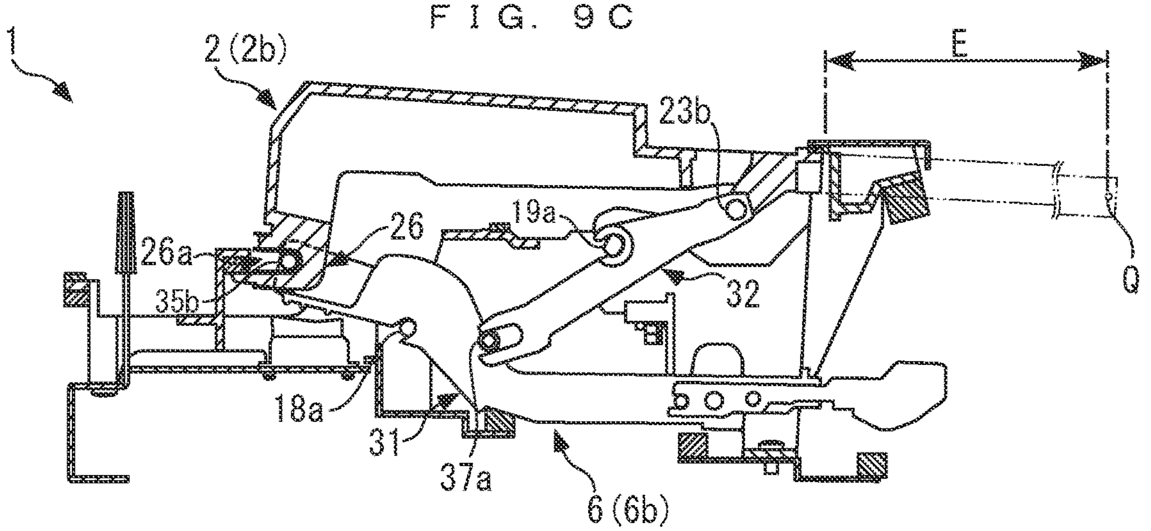
Figure 9D:
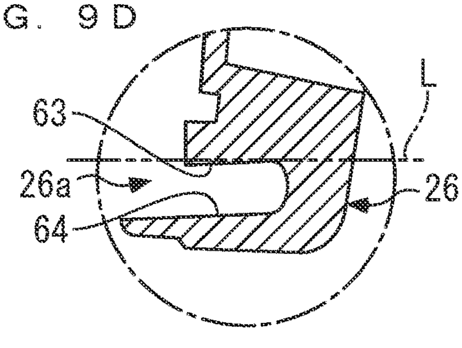

On the other hand, FIG. 9C is a side cross-sectional view of the keyboard device 1 with the focus on the black key 2*b*, and FIG. 9D shows the connecting recess 26*a* of the black key 2*b* on an enlarged scale. As described above, during key depression, the black key 2*b* operates such that it pivotally moves about the virtual pivot Q appearing in FIG. 9C. In this case, a virtual pivot length E, which is a length from a rear end of the black key 2*b* to the virtual pivot Q, is longer than the virtual pivot length D of the white key 2*a* since the extension direction of the connecting recess 26*a* is more inclined downward toward the front than that of the connecting recess 22*a* of the white key 2*a* (E>D).

Figure 10A:
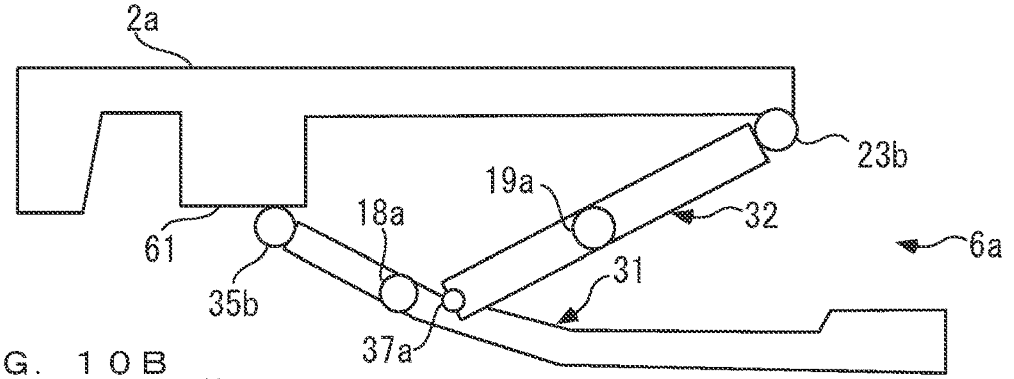
Figure 10B:
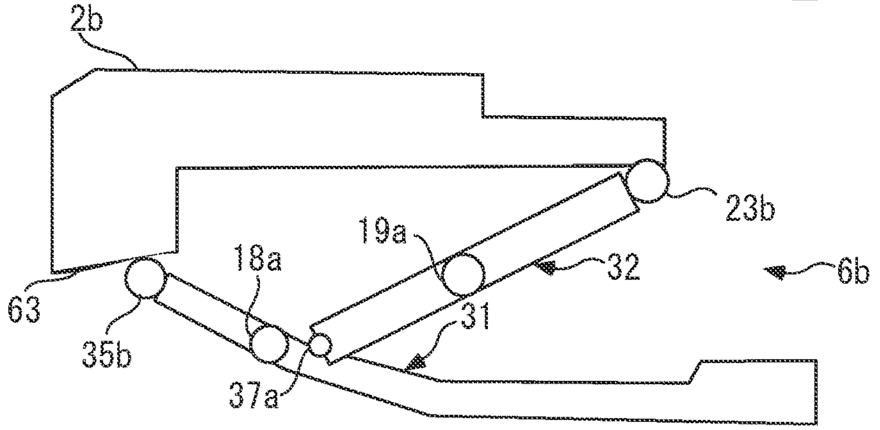
Figure 11A:
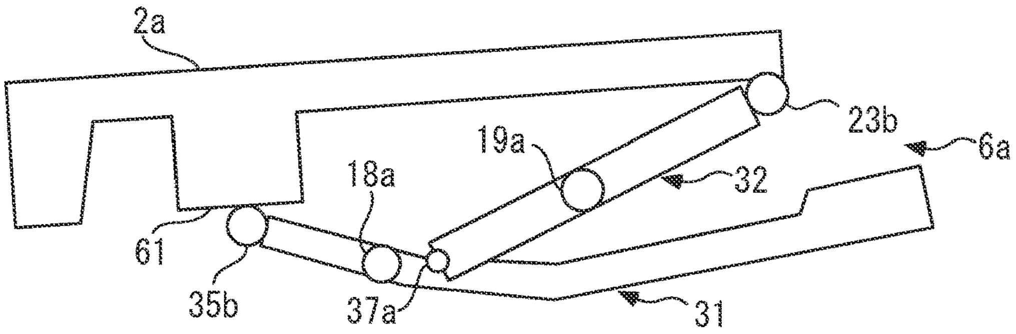
Figure 11B:
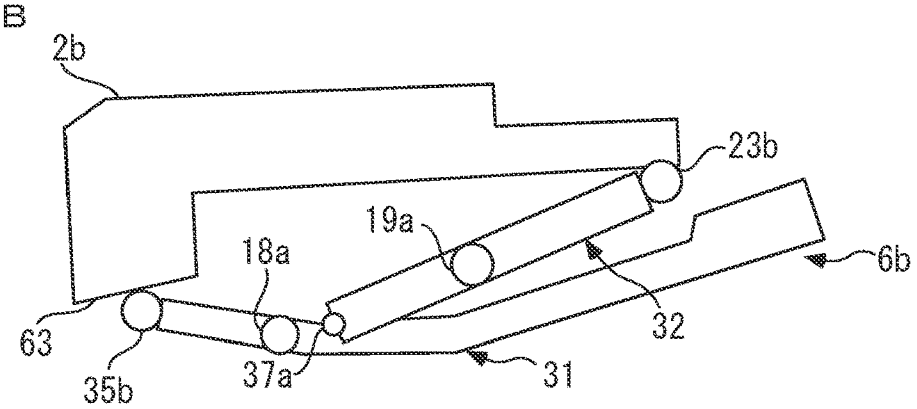

Here, the operating principle of the keyboard device 1 in which the virtual pivot length E of the black key 2*b* is longer than the virtual pivot length D of the white key 2*a* as described above, will be described with reference to schematic views of FIGS. 10A and 10B and FIGS. 11A and 11B. FIGS. 10A and 10B show the white key 2*a* and the key support mechanism 6*a* therefor and the black key 2*b* and the key support mechanism 6*b* therefor, when in the key-released state, respectively. Note that in these schematic views, for the connecting recess 22*a* of the white key 2*a* and the connecting recess 26*a* of the black key 2*b*, only the upper surfaces 61 and 63 are illustrated which function as points of action when the first arms 31 are pivotally moved in a counterclockwise direction. Further, to make it easy to understand a difference between the inclinations of the two upper surfaces 61 and 63, the inclination of the upper surface 63 is illustrated larger than actual inclination.

As shown in FIGS. 10A and 10B, in the key-released states, the first arms 31 and the second arms 32 of the respective key support mechanisms 6*a* and 6*b* for the white key 2*a* and the black key 2*b* are maintained in the same posture. When the front end of the white key 2*a* is depressed from this state, the connecting shaft 35*b* is depressed via the upper surface 61, whereby the first arm 31 is pivotally moved in the counterclockwise direction about the first pivot shaft 18*a*. On the other hand, the connecting shaft 37*a* is moved upward in accordance with the above-mentioned pivotal movement of the first arm 31, whereby the second arm 32 is pivotally moved in the clockwise direction about the second pivot shaft 19*a*. Then, when the white key 2*a* is depressed to the lowest position, the first arm 31 is pivotally moved to a position shown in FIG. 11A.

On the other hand, when the front end of the black key 2*b* is depressed from the state shown in FIG. 10B, the first arm 31 and the second arm 32 are pivotally moved, similar to the white key 2*a*. In the black key 2*b*, however, since the inclination of the upper surface 63 (the connecting recess 26*a*) is larger than the inclination of the upper surface 61 (the connecting recess 22*a*) of the white key 2*a*, when the black key 2*b* is depressed to the lowest position, the connecting shaft 35*b* of the first arm 31, which is slid forward along the upper surface 63, is positioned lower than that of the first arm 31 for the white key 2*a*. As a consequence, the angle of pivotal movement of the first arm 31 for the black key 2*b* becomes larger than that of the first arm 31 for the white key 2*a*. In addition, the angle of pivotal movement of the second arm 32 for the black key 2*b* also becomes larger than that of the second arm 32 for the white key 2*a*. With this, the engagement protrusions 23*b* of the rear end of the black key 2*b* are pulled down lower than the engagement protrusions 23*b* of the white key 2*a*, so that the virtual pivot length E of the black key 2*b* becomes longer than the virtual pivot length D of the white key 2*a*.

Figure 12A:
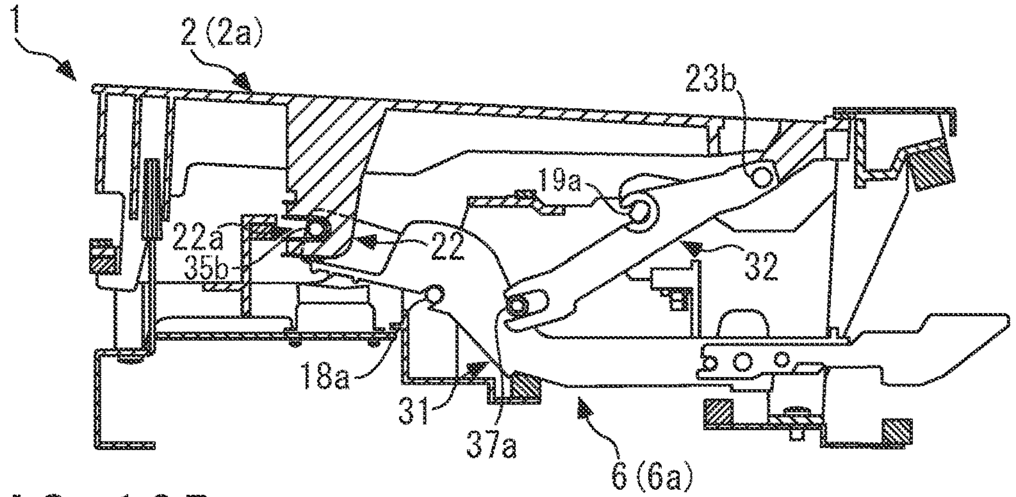
Figure 12B:
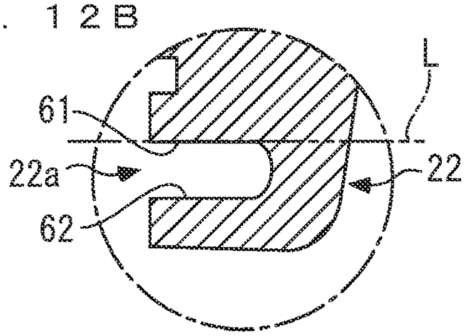

Next, with reference to FIGS. 12A to 13B, a description will be given of the keyboard device 1 configured such that, for the key 2 in the higher-pitched range and the key 2 in the lower-pitched range, the angles of pivotal movement of the first arms 31 therefor, caused by key depression, are made different from each other, whereby the touch weights of the keys 2 are made different from each other. FIGS. 12A to 12D are views similar to FIGS. 9A to 9D. FIG. 12A is a side cross-sectional view of the keyboard device 1 with the focus on a white key 2 in the higher-pitched range, and FIG. 12B shows a connecting recess 22*a* of the white key 2 appearing in FIG. 12A on an enlarged scale. As shown in FIG. 12B, the connecting recess 22*a* of the white key 2 in the higher-pitched range is configured to extend in the front-rear direction along the reference line L when in the key-released state.

Figure 12C:
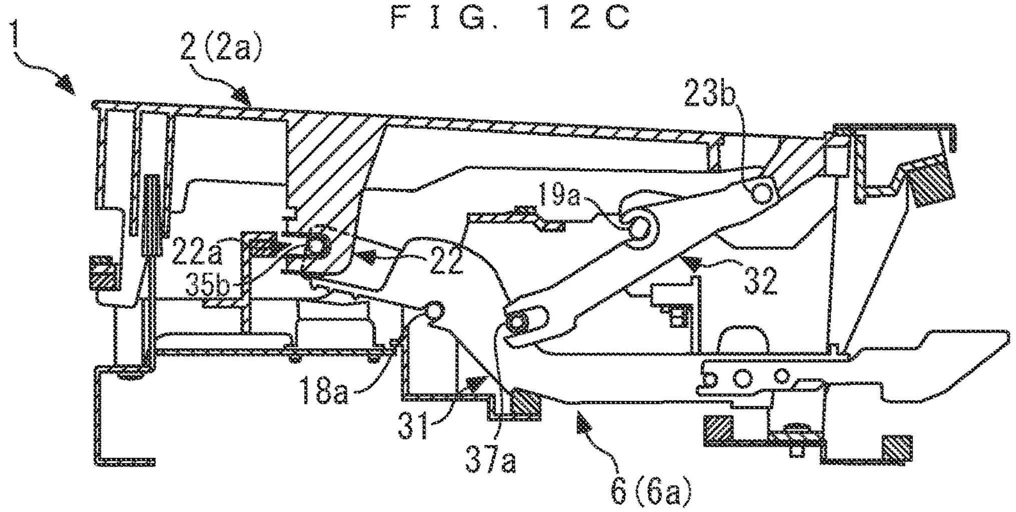
Figure 12D:
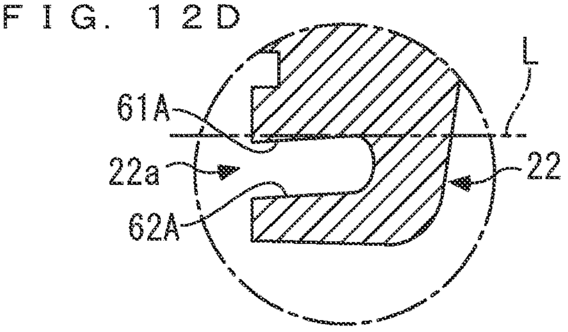

On the other hand, FIG. 12C is a side cross-sectional view of the keyboard device 1 with the focus on a white key 2*a* in the lower-pitched range, and FIG. 12D shows a connecting recess 22*a* of the white key 2*a* appearing in FIG. 12C on an enlarged scale. As shown in FIG. 12D, the connecting recess 22*a* of the white key 2*a* in the lower-pitched range includes an upper surface 61A and a bottom surface 62A, and is formed by the upper surface 61A and the bottom surface 62A such that in the key-released state, the connecting recess 22*a* slopes downward as it extends forward (slopes downward to the left as viewed in FIG. 12D) at a predetermined angle (e.g. one to two degrees) with respect to the reference line L. Thus, the extension direction of the connecting recess 22*a* of the white key 2*a* in the lower-pitched range is more inclined downward toward the front than that of the connecting recess 22*a* of the white key 2*a*.

Figure 13A:
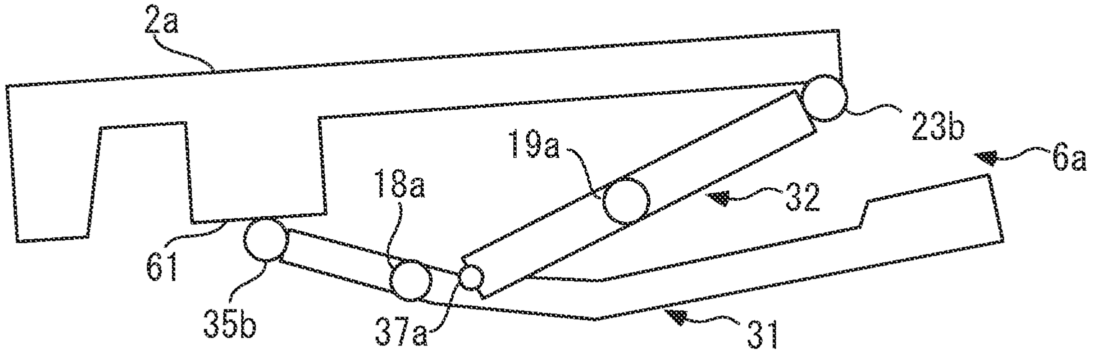
FIGS. 13A and 13B are schematic views showing key-depressed states of the white keys corresponding to FIG. 12A and FIG. 12C, respectively.
Figure 13B:
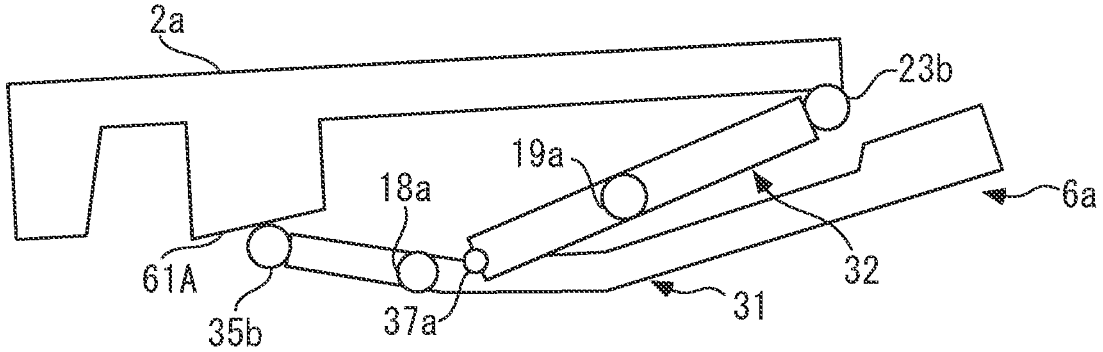

FIGS. 13A and 13B are schematic views showing key-depressed states of the white keys, which correspond to FIG.

12A and FIG. 12*c*, respectively. As shown in FIG. 13B, in the key support mechanism 6*a* that supports the white key 2*a* in the lower-pitched range, the angle of the pivotal movement of the first arm 31, caused by key depression, is larger than that of the first arm 31 of the key support mechanism 6*a*, shown in FIG. 13A, which supports the white key 2*a* in the higher-pitched range. With this, the touch weight of the white key 2*a* in the lower-pitched range becomes heavier than the touch weight of the white key 2*a* in the higher-pitched range.

Figure 14A:
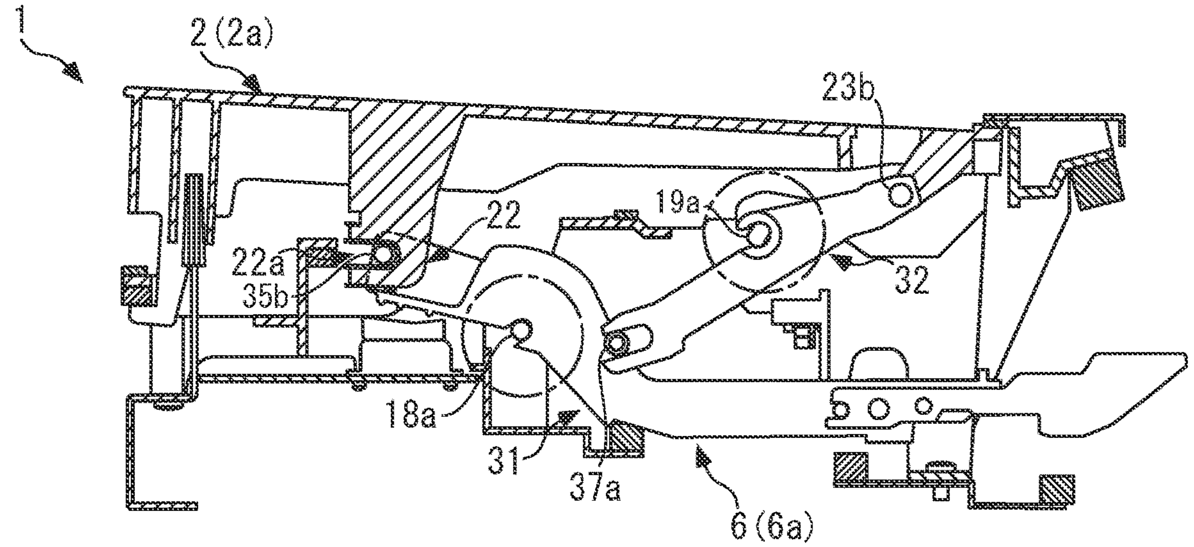
Figure 14B:
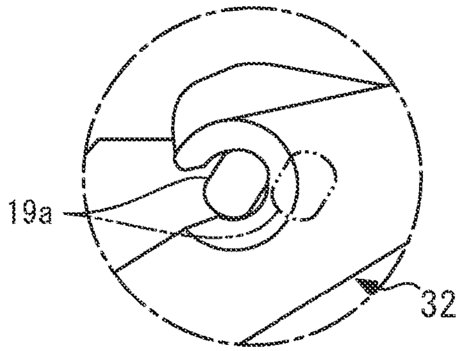
Figure 14C:
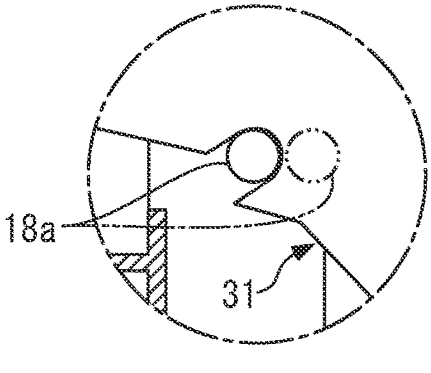

FIGS. 14A to 14C are views useful in explaining another embodiment, which is configured such that the angle of pivotal movement of the first arm 31, caused by key depression, varies depending on the type of the key 2. FIG. 14A is a side cross-sectional view of the keyboard device 1 with the focus on the white key 2*a*. In this keyboard device 1, the second pivot shaft 19*a* that supports the second arm 32 of each key support mechanism 6 and the first pivot shaft 18*a* that supports the first arm 31 of each key support mechanism 6 are provided in a state displaced from each other in a predetermined direction by a predetermined length, between the white key 2*a* and the black key 2*b* and between the key 2 in the higher-pitched range and the key 2 in the lower-pitched range.

FIG. 14B shows an example in which the two second pivot shafts 19*a* and 19*a* that support the second arms 32, respectively, are provided at respective locations different from each other. In FIG. 14B, the two second pivot shafts 19*a* and 19*a* are provided in a state displaced from each other in the front-rear direction by a diameter of the second pivot shaft 19*a*.

Further, FIG. 14C shows an example in which the two first pivot shafts 18*a* and 18*a* that support the first arms 31, respectively, are provided at respective locations different from each other. In FIG. 14C, the two first pivot shafts 18*a* and 18*a* are provided in a state displaced from each other in the front-rear direction by a diameter of the first pivot shaft 18*a*.

As described above, by setting the locations of the second pivot shafts 19*a* depending on the type of the key 2, and in addition by setting the locations of the first pivot shafts 18*a* depending on the type of the key 2, the angle of pivotal movement of the first arm 31 caused by key depression can be adjusted, whereby it is possible to adjust the virtual pivot length and the touch weight according to the type of the key 2.

Figure 15A:
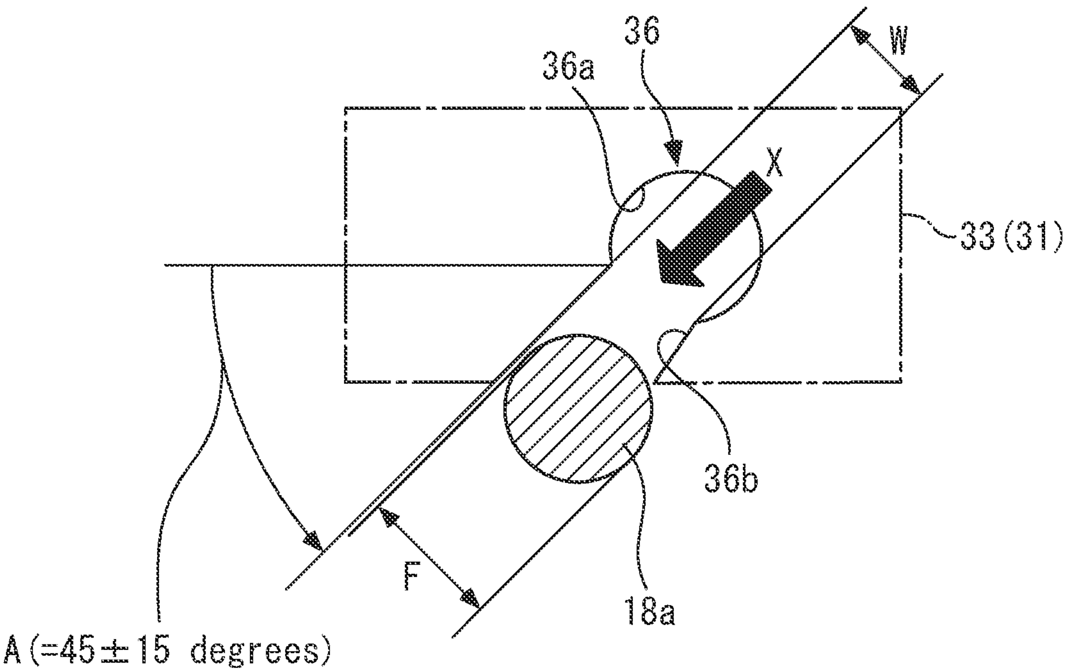
Figure 15B:
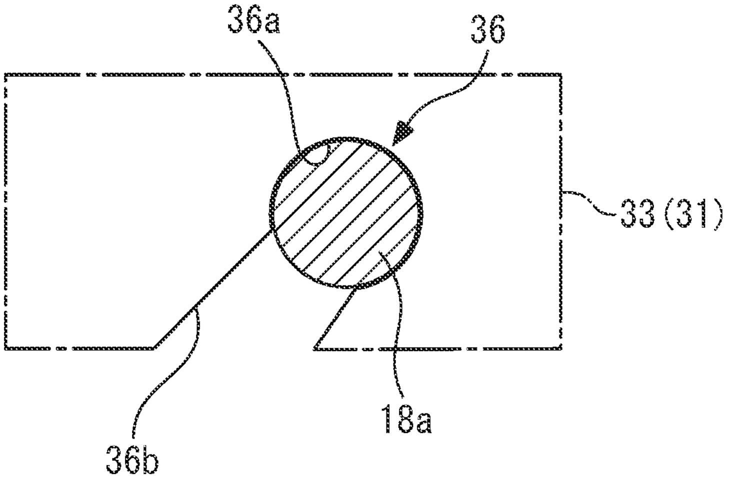

Next, the essential part of the second aspect of the present invention will be described with reference to FIGS. 15A to 18B. FIGS. 15A and 15B show the bearing portion 36 of the arm body 33 of the first arm 31 and the first pivot shaft 18*a* that supports the bearing portion 36, on an enlarged scale. Note that to make it easy to understand the configuration, FIGS. 15A and 15B schematically show a guide groove 36*b* by illustrating the same as a groove slightly longer than actual length, and so forth.

As described hereinabove, the first pivot shaft 18*a* is integrally formed with the chassis intermediate 12 (not shown in FIGS. 15A and 15B) of the keyboard chassis 4, extends horizontally, and is circular in cross-section with a predetermined diameter F. The bearing portion 36 has a circular shaft hole 36*a* formed in the vicinity of a lower surface of the arm body 33, and the guide groove 36*b* which opens in the lower surface of the arm body 33, extends obliquely upward therefrom, and is continuous with the shaft hole 36*a*.

The guide groove 36*b* has a groove width W slightly smaller than the diameter F of the first pivot shaft 18*a*, and the shaft hole 36*a* has a diameter which is set to be approximately equal to the diameter F of the first pivot shaft 18*a* such that the shaft hole 36*a* is pivotally fitted on the first pivot shaft 18*a*. Further, an inclination angle A of the guide groove 36*b* with respect to horizontal in the key-released state is preferably within a range of 45±15 degrees for a reason described hereinafter, and is set to approximately 45 degrees in the example illustrated in FIG. 15A.

With this construction, the first arm 31 is mounted on the first pivot shaft 18*a* as described below. First, the first arm 31 is, after being positioned as in FIG. 15A, moved obliquely downward (in a direction indicated by an arrow X) toward the first pivot shaft 18*a*, and a tip end of the guide groove 36*b* is pressed against the first pivot shaft 18*a* for engagement therewith. Then, when the first arm 31 is further pressed in the same direction, the first arm 31 is moved obliquely downward while being guided by the guide groove 36*b*, in a state where the guide groove 36*b* having a narrow width is elastically pushed laterally outward by the first pivot shaft 18*a*. Then, when the guide groove 36*b* overcomes the first pivot shaft 18*a*, the guide groove 36*b* elastically returns to an original state thereof and at the same time the shaft hole 36*a* is fitted (snap-fitted) on the first pivot shaft 18*a*. With this, as shown in FIG. 15B, the first arm 31 is mounted on the first pivot shaft 18*a* via the shaft hole 36*a* and is pivotally supported thereon.

As described above, the first arm 31 is snap-fitted on the first pivot shafts 18*a* via the bearing portion 36. Further, the guide groove 36*b* extends obliquely from the lower surface of the first arm 31 to the shaft hole 36*a*. For this reason, e.g. during transportation of a keyboard device as a manufactured product, when impact in the front-rear direction or in the vertical direction acts on the keyboard device 1, a direction of inertial force due to the impact is largely different from a direction of the guide groove 36*b*, whereby the inertial force is dispersed. As a result, when impact acts on the keyboard device 1, it is possible to effectively suppress disengagement of the first arm 31 from the first pivot shaft 18*a*.

Figure 16:
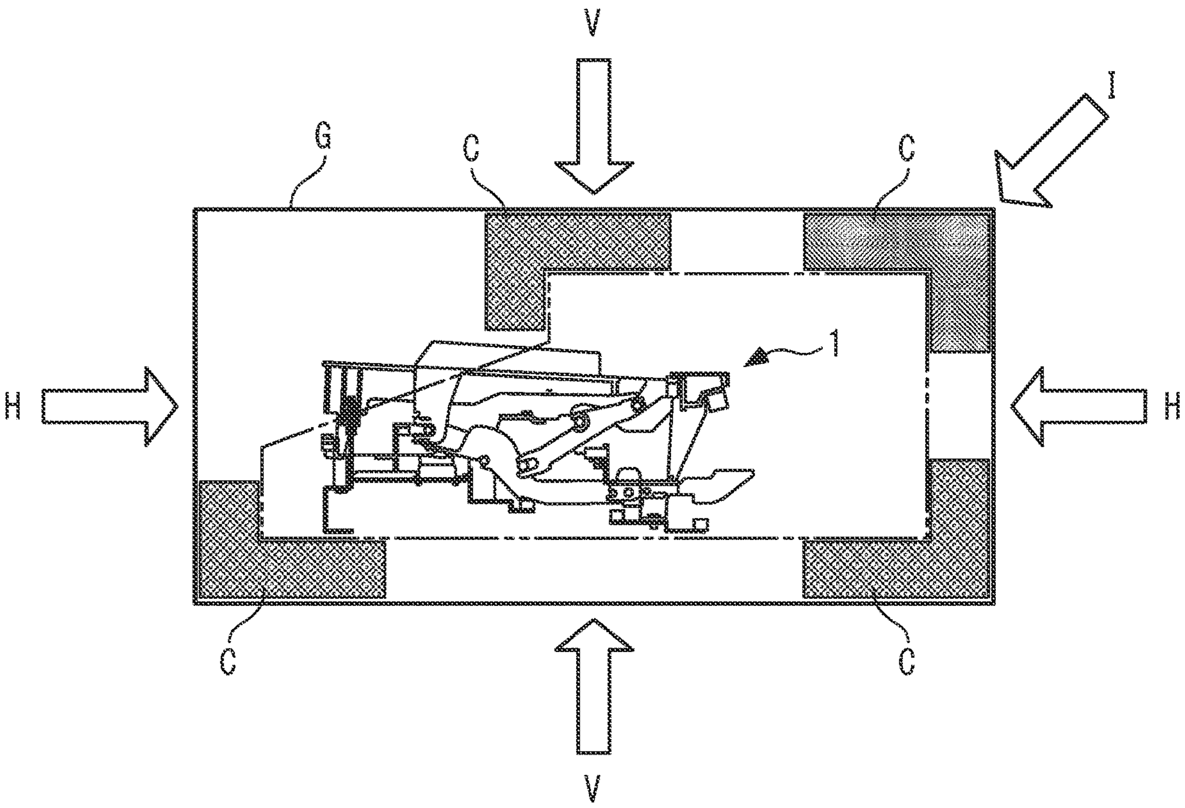
FIG. 16 is a view useful in explaining a packed state of the keyboard device and a status of impact acting e.g. during transportation of the keyboard device.

For example, when the electronic piano including the keyboard device 1 of the present embodiment is transported as a manufactured product, normally, as shown in FIG. 16, it is received in a container box G made of e.g. cardboard in a state where four corners of the electronic piano are covered by a cushioning material C, such as styrofoam. Therefore, in many cases, impact on the keyboard device 1 during transportation thereof acts in a front-rear direction (H) or in a vertical direction (V).

When the impact on the keyboard device 1 acts in the front-rear direction, in the above-described keyboard device disclosed in Japanese Laid-Open Patent Publication (Kokai) No. 2016-191832, since the hammer is fitted on the support shaft from the front side and the direction of inertial force due to the impact and the direction of fitting the hammer are almost the same, there is a fear that the hammer is disengaged from the support shaft. Further, when the impact on the keyboard device acts in the vertical direction, in the keyboard device disclosed in Japanese Laid-Open Patent Publication (Kokai) No. 2015-87591, since the hammer is fitted on the support shaft from above and the direction of inertial force due to the impact and the direction of fitting the hammer are almost the same, there still is a fear that the hammer is disengaged from the support shaft.

On the other hand, in the keyboard device 1 of the present embodiment, as described hereinabove, when the impact in the front-rear direction or in the vertical direction acts, the direction of inertial force due to the impact is largely different from the direction of the guide groove 36*b*, whereby the inertial force is dispersed, so that it is possible to effectively suppress disengagement of the first arm 31 from the first pivot shaft 18*a*.

Note that as shown in FIG. 16, when the impact on the keyboard device 1 acts in an oblique direction (I), the direction of inertial force due to the impact is sometimes equal to the direction of the guide groove 36*b*. In this case, however, the container box G is crushed to absorb part of the impact, and the first arm upper limit stopper 10*a* with which the pivotally-moved first arm 31 is brought into contact supports part of the impact, which prevents disengagement of the first arm 31.

Figure 17A:
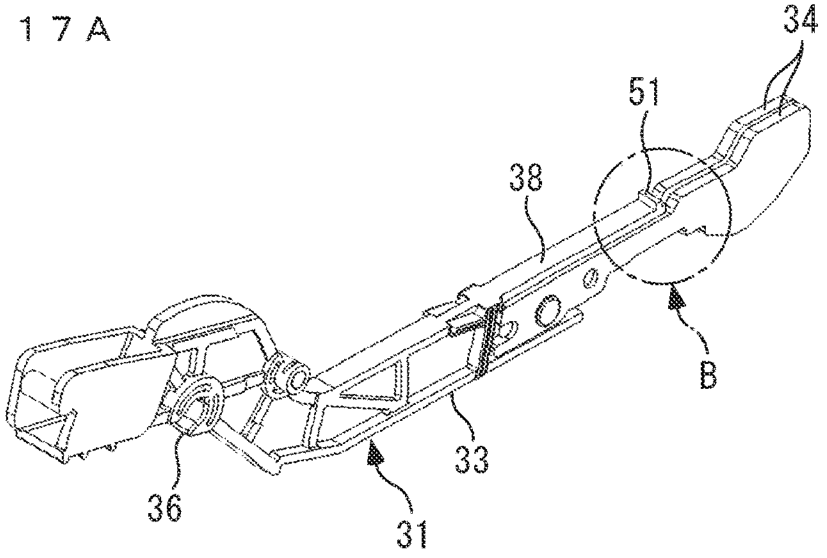
FIG. 17A is a perspective view of the first arm formed with a recessed and protruded portion for removing the first arm.
Figure 17B:
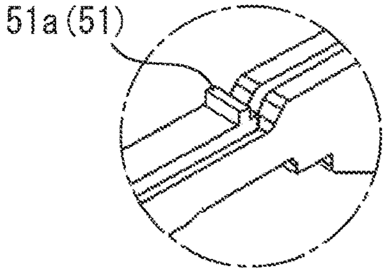
FIGS. 17B to 17D are partially enlarged views of a portion B in FIG. 17A, which show examples of the recessed and protruded portion, which are different from each other.

Next, a recessed and protruded portion for removing the first arm 31 will be described with reference to FIGS. 17A to 17D and FIGS. 18A and 18B. As shown in FIG. 17A, the recessed and protruded portion, denoted by reference numeral 51, is formed on the arm body 33 (weight mounting portion 38) of the first arm 31. More specifically, as shown in FIG. 17B, the recessed and protruded portion 51 is formed by a protrusion 51*a* which is integrally formed on a rear end of an upper surface of the arm body 33 and protrudes upward from along the entirety width of the rear end of the upper surface of the arm body 33.

Figure 18A:
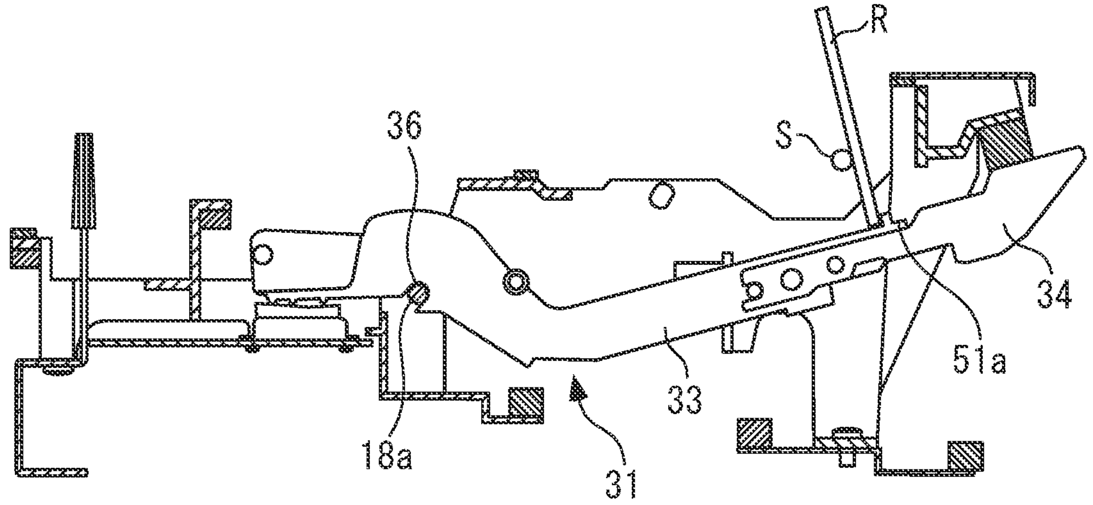
FIGS. 18A and 18B are views of the first arm in states before and after the first arm is removed from the first pivot shaft, respectively, using the recessed and protruded portion shown in FIGS. 17A to 17D.

With this construction, the first arm 31 is removed from the first pivot shaft 18*a* by using the protrusion 51*a* as described below. First, as shown in FIG. 18A, after the key 2 is removed from the keyboard device 1 in an assembled state, a rod-like tool R, such as a screwdriver, is inserted from above to apply a tip end of the tool R on (engage the same with) the front surface of the protrusion 51*a*. Then, an intermediate portion of the tool R is pressed against an appropriate portion S of the keyboard chassis 4 (chassis rear 13), the portion S existing in the vicinity and forward of the intermediate portion, and the tool R is turned using the portion S as a fulcrum in a direction indicated by an arrow Y in FIG. 18B. With this, as indicated by an arrow Z, the first arm 31 is driven along the guide groove 36*b* obliquely upward and rearward, whereby it is removed from the first pivot shafts 18*a*.

As described above, the rod-like tool R, which is applied to the protrusion 51*a* formed on the upper surface of the first arm 31, is turned using the portion S of the keyboard chassis 4 as a fulcrum based on the principle of leverage, whereby the first arm 31 is removed. With this, the first arm 31, which is snap-fitted and is difficult to remove, can be easily removed from the first pivot shaft 18*a* without using a special tool.

As described hereinabove, according to the keyboard device 1 to which is applied the essential part of the first aspect of the present invention, the angle of pivotal movement of the first arm 31 which is pivotally moved in a manner interlocked with depression of an associated key 2 is set such that the angle varies depending on the type of the key 2, whereby the touch weight and the virtual pivot length of the key 2 during depression of the key can be adjusted according to the type of the key 2, and consequently it is possible to obtain the same key operation as that of an acoustic grand piano.

Note that the first aspect of the present invention is not limited to the above-described embodiment, but it can be practiced in various forms. For example, although in the above-described embodiment, while the key front-side connecting portions 22 and 26 of the key 2 are formed with the connecting recesses 22*a* and 26*a*, respectively, the first arm front-side connecting portion 35 of the first arm 31 is formed with the connecting shaft 35*b*, it is also possible to reverse the positional relationship between the connecting recesses 22*a* and 26*a* and the connecting shaft 35*b* which are engaged with each other, that is, it is possible to form the connecting recesses in the first arm 31 and form the connecting shaft on the key 2.

Further, in the above-described embodiment, as the inclinations of the connecting recesses 22*a* and 26*a* of the key 2 in the extension directions thereof, only two types are described, by way of example. However, in the keyboard device 1, it is also possible to set three or more types of inclinations as the inclinations of the connecting recesses 22*a* and 26*a* in the extension directions thereof. With this, the angle of pivotal movement of the first arm 31 caused by depression of the key 2 can be finely set according to a larger number of types of keys 2 (including e.g. keys in a middle-pitched range in addition to the keys in the lower-pitched range and the higher-pitched range).

Furthermore, although in the above-described embodiment, the description is given of a case where the present invention is applied to the keyboard device 1 in which the keys 2 depressed operate such that they pivotally move about the virtual pivots P and Q located rearward of the rear ends of the keys 2, respectively, the present invention is not limited to this, but as a matter of course, the present invention can be applied to a general keyboard device in which keys are pivotally moved about the rear ends of their own, respectively, and each of which is not provided with the second arm 32. Further, details of the constructions of the keys 2 and the key support mechanisms 6 shown in the embodiment are given only by way of example, and they can be modified as appropriate within the scope of the subject matter of the present invention.

Further, the second aspect of the present invention is not limited to the above-described embodiment, but it can be practiced in various forms. For example, although in the above-described embodiment, the inclination angle A of the guide groove 36*b* of the first arm 31 with respect to horizontal in the key-released state is set to approximately 45 degrees, the inclination angle A is only required to be within the range of 45±15 degrees. This is because if the inclination angle A is larger than 60 degrees, the inclination of the guide groove 36*b* is close to vertical, which causes insufficient dispersion of inertial force when the impact in the vertical direction acts, whereas if the inclination angle A is smaller than 30 degrees, the inclination of the guide groove 36*b* is close to horizontal, which causes insufficient dispersion of inertial force when the impact in the front-rear direction acts. Therefore, if the inclination angle A is within the range of 45±15 degrees, inertial force caused by impact is sufficiently dispersed, whereby it is possible to effectively suppress disengagement of the first arm 31 and obtain the same advantageous effects as provided by the inclination angle A of approximately 45 degrees.

Figure 17C:
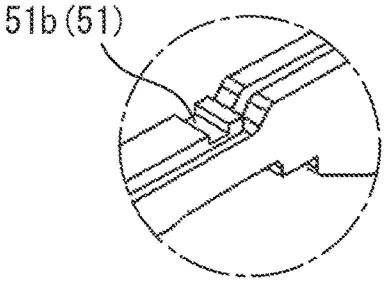
Figure 17D:
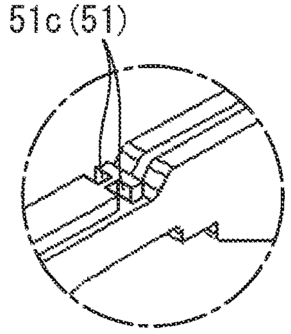
Figure 18B:
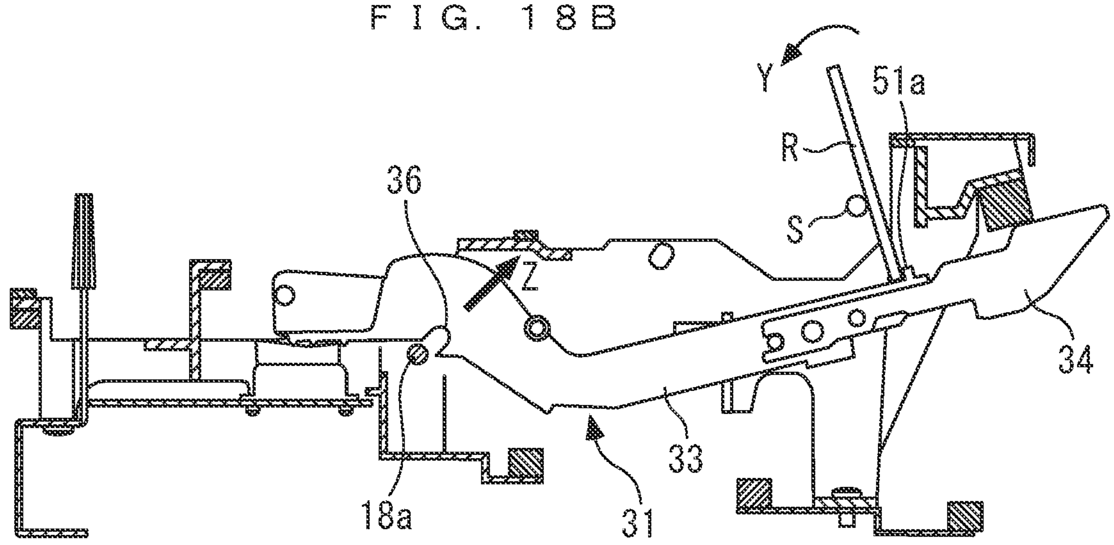

Further, although in the above-described embodiment, the protrusion 51*a* shown in FIG. 18B is provided as the recessed and protruded portion 51 for removing the first arm 31, any desired configuration of the corresponding portion can be employed insofar as the portion enables the tool R to be engaged therewith and the first arm 31 to be thereby turned. FIGS. 17C and 17D show other examples of the recessed and protruded portion 51 which are configured as such. In the example illustrated in FIG. 17C, the recessed and protruded portion 51 is formed by a recessed portion 51*b* formed along the entire width of the upper surface of the arm body 33, whereas in the example illustrated in FIG. 17D, the recessed and protruded portion 51 is formed by a pair of cutouts 51*c* which are formed in the upper surface of the arm body 33 at respective locations spaced from each other in a width direction of the upper surface. With these configurations, similar to the case of the above-described protrusion 51*a*, by engaging an appropriate tool R with the concave portion 51*b* or the cutouts 51*c* and turning the first arm 31, it is possible to easily remove the first arm 31 from the first pivot shaft 18*a*.

Further, details of the construction of the embodiment, for example, the configuration and dimensional relationship between components of the bearing portion 36 of the first arm 31 shown in FIGS. 15A and 15B, are given only by way of example, and they can be modified as appropriate within the scope of the subject matter of the present invention.

What is claimed is:

1. A keyboard device for a keyboard instrument, comprising:

a keyboard chassis;

a plurality of keys each extending in a front-rear direction and arranged side by side in a left-right direction on the keyboard chassis; and a plurality of hammers extending in the front-rear direction and provided in association with the plurality of keys, respectively, the hammers being pivotally supported, below the keys, on the keyboard chassis, each via a hammer support shaft, and arranged side by side in the left-right direction, for each being pivotally moved in a manner interlocked with depression of an associated one of the keys, wherein the hammer support shafts are arranged in such a manner that for a predetermined first hammer of the plurality of hammers, which is associated with a predetermined first key of the plurality of keys, and a predetermined second hammer of the plurality of hammers, which is associated with a predetermined second key of the plurality of keys, respective angles of pivotal movement, caused by key depression, of the first hammer and the second hammer are set to be different from each other.

2. The keyboard device according to claim 1, wherein each key and each hammer associated with the key are provided with a key-side engagement portion and a hammer-side engagement portion, respectively, for engagement with each other, wherein one of the key-side engagement portion and the hammer-side engagement portion includes an engagement recess extending in the front-rear direction, wherein the other of the key-side engagement portion and the hammer-side engagement portion includes an engagement shaft that extends in the left-right direction and is pivotally and slidably engaged with the engagement recess, and wherein in a key-released state, an inclination of an extension direction of the engagement recess of the first key or the first hammer, and an inclination of an extension direction of the engagement recess of the second key or the second hammer are set to be different from each other.

3. The keyboard device according to claim 1, further comprising a plurality of connecting arms each extending in the front-rear direction and arranged side by side in the left-right direction in association with the plurality of keys, respectively, each connecting arm being pivotally supported on the keyboard chassis via an arm support shaft between an associated one of the keys and a hammer associated with the key, and having a front end pivotally and slidably connected to a predetermined portion of the hammer and a rear end pivotally connected to a rear end of the key, for being pivotally moved in a manner interlocked with depression of the key.

4. The keyboard device according to claim 1, further comprising a plurality of connecting arms each extending in the front-rear direction and arranged side by side in the left-right direction in association with the plurality of keys, respectively, each connecting arm being pivotally supported on the keyboard chassis via an arm support shaft between an associated one of the keys and a hammer associated with the key, and having a front end pivotally and slidably connected to a predetermined portion of the hammer and a rear end pivotally connected to a rear end of the key, for being pivotally moved in a manner interlocked with depression of the key, and wherein a first arm support shaft which is associated with the first key and supports a predetermined first connecting arm of the plurality of connecting arms, and a second arm support shaft which is associated with the second key and supports a predetermined second connecting arm of the plurality of connecting arms, are provided in a state displaced from each other in a predetermined direction by a predetermined length.

5. The keyboard device according to claim 4, wherein a first hammer support shaft supporting the first hammer and a second hammer support shaft supporting the second hammer are provided in a state displaced from each other in a predetermined direction by a predetermined length.

6. The keyboard device according to claim 1, wherein for the first hammer, the angle of pivotal movement thereof caused by key depression is set to be larger than that of the second hammer, wherein the first key is set as a black key, and wherein the second key is set as a white key.

7. The keyboard device according to claim 1, wherein for the first hammer, the angle of pivotal movement thereof caused by key depression is set to be larger than that of the second hammer, wherein the first key is set as a key in a lower-pitched range of the keyboard device, and wherein the second key is set as a key in a higher-pitched range of the keyboard device.

8. A keyboard device for a keyboard instrument, comprising:

a chassis;

a key which is pivotally movable; and a hammer pivotally supported on a support shaft of the chassis, for being pivotally moved in a manner interlocked with the key which is depressed, wherein the hammer includes a shaft hole which can be fitted on the support shaft, and a guide groove which extends obliquely upward from a lower surface of the hammer such that the guide groove is continuous with the shaft hole and has a groove width smaller than a diameter of the support shaft, the guide groove guiding the shaft hole to the support shaft when the hammer is attached to the support shaft, wherein the shaft hole is snap-fitted on the support shaft.

9. The keyboard device according to claim 8, wherein in a key-released state of the key, the guide groove extends obliquely at an angle of 45±15 degrees with respect to horizontal.

10. The keyboard device according to claim 8, wherein the hammer is formed with a recessed and protruded portion for engagement with a tool for causing the hammer to be moved obliquely upward from the support shaft, for removal.

* * * * *